(12) United States Patent
Itou et al.

(10) Patent No.: US 8,482,228 B2
(45) Date of Patent: *Jul. 9, 2013

(54) VISIBLE INDICATION OF MISTAKEN LAMP USE

(75) Inventors: Kazuhiko Itou, Osaka (JP); Masayoshi Gyoten, Shiga (JP); Shiro Iida, Kyoto (JP)

(73) Assignee: Panasonic Corporation, Osaka (JP)

( * ) Notice: Subject to any disclaimer, the term of this patent is extended or adjusted under 35 U.S.C. 154(b) by 383 days.

This patent is subject to a terminal disclaimer.

(21) Appl. No.: 12/711,986

(22) Filed: Feb. 24, 2010

(65) Prior Publication Data

US 2010/0171431 A1  Jul. 8, 2010

Related U.S. Application Data

(62) Division of application No. 11/611,752, filed on Dec. 15, 2006, now Pat. No. 7,701,153.

(51) Int. Cl.
*H05B 41/00* (2006.01)

(52) U.S. Cl.
USPC ............ 315/363; 315/136; 315/307; 323/276

(58) Field of Classification Search
USPC ............ 315/119, 120, 209 R, 307, 136, 159, 315/363, 291; 313/323; 323/207, 275, 276; 361/1, 18
See application file for complete search history.

(56) References Cited

U.S. PATENT DOCUMENTS

| 4,298,869 | A | * | 11/1981 | Okuno ........................... 345/82 |
| 4,329,625 | A | * | 5/1982 | Nishizawa et al. ........... 315/158 |
| 5,677,602 | A | * | 10/1997 | Paul et al. ..................... 315/307 |
| 5,686,798 | A | * | 11/1997 | Mattas ........................ 315/224 |
| 5,962,981 | A | * | 10/1999 | Okude et al. .............. 315/209 R |
| 6,137,233 | A | * | 10/2000 | Moisin ..................... 315/209 R |
| 6,232,727 | B1 | * | 5/2001 | Chee et al. ..................... 315/307 |
| 6,234,649 | B1 | * | 5/2001 | Katougi ........................ 362/248 |
| 6,414,449 | B1 | * | 7/2002 | Hui et al. ...................... 315/291 |
| 7,099,132 | B2 | * | 8/2006 | Moisin ............................ 361/18 |
| 7,719,206 | B2 | * | 5/2010 | Ren et al. ...................... 315/291 |
| 7,852,009 | B2 | * | 12/2010 | Coleman et al. ........... 315/185 S |
| 2004/0012347 | A1 | * | 1/2004 | Ribarich ........................ 315/291 |
| 2004/0195976 | A1 | * | 10/2004 | Balakrishnan et al. ....... 315/291 |

* cited by examiner

*Primary Examiner* — Haiss Philogene

(57) ABSTRACT

A lamp includes an arc tube and a lighting unit for lighting the arc tube. The lighting unit includes a rectifier circuit, a smoothing circuit for partial smoothing, and an inverter circuit having a pair of switching elements. The smoothing circuit smoothes portions of the output voltage of the rectifier circuit below the first voltage value and outputs a voltage that falls between the first voltage value and the second voltage value. The discharge sustaining voltage of the arc tube is set to fall between the first and second values of the voltage Vdc output from the smoothing circuit.

13 Claims, 20 Drawing Sheets

VISIBLE INDICATION OF MISTAKEN LAMP USE

CROSS-REFERENCE TO RELATED APPLICATION

The present application is a divisional application of U.S. patent application Ser. No. 11/611,752 filed on Dec. 15, 2006, now Pat. No. 7,701,153.

BACKGROUND OF THE INVENTION

1. Field of the Invention

The present invention relates to a 277V lamp having a light-emitting unit and a lighting circuit that is for lighting the light-emitting unit.

2. Description of Related Art

Conventional low-pressure discharge lamps have an arc tube and an electronic lighting circuit for lighting the arc tube. Examples of such lamps include self-ballasted fluorescent lamps (hereinafter, also referred to simply as "lamps"). There are two types of lamps depending on the rated lamp voltage. One is a 277V type designed for operation at 277 volts. The other is a 120V type designed for operation at 120 volts. (Hereinafter 277V type and 120V type lamps are simply referred to as "277V lamps" and "120V lamps," respectively.) Mainly, 277V lamps are for use at commercial facilities and outdoors, whereas 120V lamps are for use at home.

Lamps of the both types are similar in size and shape. Thus, it is often the case that a 277V lamp is mistakenly used with a 120V lighting fixture (Such operation is improper and is also referred to as "misuse").

Lamps of the both types are similar in size and shape. Thus, it is often the case that a 277V lamp is mistakenly used with a 120V lighting fixture (Such operation is improper and is also referred to as "misuse").

FIGS. 1 and 2 are circuit diagrams of lighting units employed in conventional lamps.

A lighting unit 901 illustrated in FIG. 1 includes a rectifier circuit 903 for rectifying commercial low-frequency current voltage into direct current voltage, a smoothing circuit 905 for smoothing the rectified direct current voltage, an inverter circuit 909 for applying a high-frequency voltage to an arc tube 907. The rectifier circuit 903 is composed of so-called a bridge diode, whereas the smoothing circuit 905 is composed of a smoothing capacitor 9C2.

The inverter circuit 909 includes two switching elements 9Q1 and 9Q2 and applies a high-frequency voltage to the arc tube 907, by alternately switching ON and OFF the two switching elements 9Q1 and 9Q2. With application of the high-frequency voltage, the arc tube 907 emits light, so that high frequency power starts to be supplied to the arc tube 907.

The lighting unit 901 illustrated in FIG. 1 is connected to a commercial power source via a base 902. Upon startup of the lamp operation, the electric current output from the smoothing circuit 905 flows through the resistors 9R1 and 9R2 and then the capacitor 9C1. When the charged voltage of the capacitor 9C1 reaches a predetermined value, a trigger diode 9TD2 breaks down and turns ON the switching element 9Q2.

Similarly to the lighting unit 901 illustrated in FIG. 1, a lighting unit 911 illustrated in FIG. 2 includes a rectifier circuit 913, a smoothing circuit 915, and an inverter circuit 917.

Upon startup of the lamp operation, the electric current output from the rectifying and smoothing circuits flows through the resistors 9R3, 9R4, and 9R5. When the fraction of voltage obtained by the resistor 9R4 reaches a predetermined value, the switching element 9Q3 is turned ON.

Although a 277V lamp and a 120V lamp differ in their rated lamp voltages, the respective lighting units are normally the same in circuitry. For this reason, even if a 277V lamp is mistakenly used for a 120V lamp, the switching elements 9Q1 and 9Q2 still start to cause the lamp to emit light. In this case of misuse, the lamp manages to operate without flickering but with various problems. For example, the intensity of a 277V lamp mistakenly used for a 120V lamp is slightly lower than the intensity of a 120V lamp under normal operation. In addition, the lamp life is shorter than the rated lamp life.

Since a mistakenly used 277V lamp operates without flickering and other immediately noticeable problems, the user may not be able to recognize that the 277V lamp is improperly used in place of a 120V lamp. With this being a situation, there is a risk that the user has a wrong impression that the lower lamp intensity and shorter lamp life are simply due to the bad quality of the lamp.

SUMMARY OF THE INVENTION

The present invention is made in view of the problems described above and aims to provide a 277V lamp for signaling users if the lamp is mistakenly used for a 120V lamp.

In order to achieve the above-described aim, the present invention provides a lamp of which rated voltage is 277 volts, that includes: a light-emitting unit including one or more light-emitting elements; and an electronic lighting circuit operable to light the light-emitting unit. When an effective source voltage is approximately 120 volts, the light-emitting unit stays unilluminated for a period in each half cycle of alternating current voltage. The unilluminated period is longer than an unilluminated period of the light-emitting unit when the effective source voltage is 277 volts.

The "unilluminated period" of the light-emitting unit in each half cycle of the alternating current voltage when the effective source voltage is approximately 120 volts is longer than an unilluminated period of the light-emitting unit when the effective source voltage is 277 volts. Thus, when the effective source voltage is approximately 120V, the unilluminated period of the light-emitting unit may be as long as the entire half cycle. In other words, when the effective source voltage is approximately 120V, the light-emitting unit does not emit light at all. Note that the "alternating current voltage" used herein refers to a voltage fed from, for example, a commercial power source.

In addition, when the effective source voltage is 277 volts, "the unilluminated period" of the light-emitting unit in each half cycle may be substantially equal to "0" seconds.

With the above structure, when the effective source voltage is 120V, the light-emitting unit stays unilluminated for a longer time period in each half cycle, as compared with a time period during which the light-emitting unit stays unilluminated under normal operation at the effective source voltage of 277V. This provides a visible indication to the user of the lamp that the lamp for 277V operation is mistakenly used with a lighting fixture for 120V lamps.

As described above, misuse of the 277V lamp with application of 120V is noticeable to the user because the lamp illuminates with annoying flickers. This structure serves to discourage stealing of the lamp of the present invention for the purpose of using it with a household lighting fixture for 120V lamps. This holds even if the lamp according to the present invention is used outdoors.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

With reference to the accompanying drawings, the following describes embodiments of the present invention directed to low-pressure discharge lamps of which rated lamp voltage is 277 volts. Note that the figures are illustrated to facilitate the description of the present invention. Thus, the size, ratio, and other values may differ from those of an actual lamp.

<First Embodiment>

1. Overall Lamp Structure

Figure 3A:
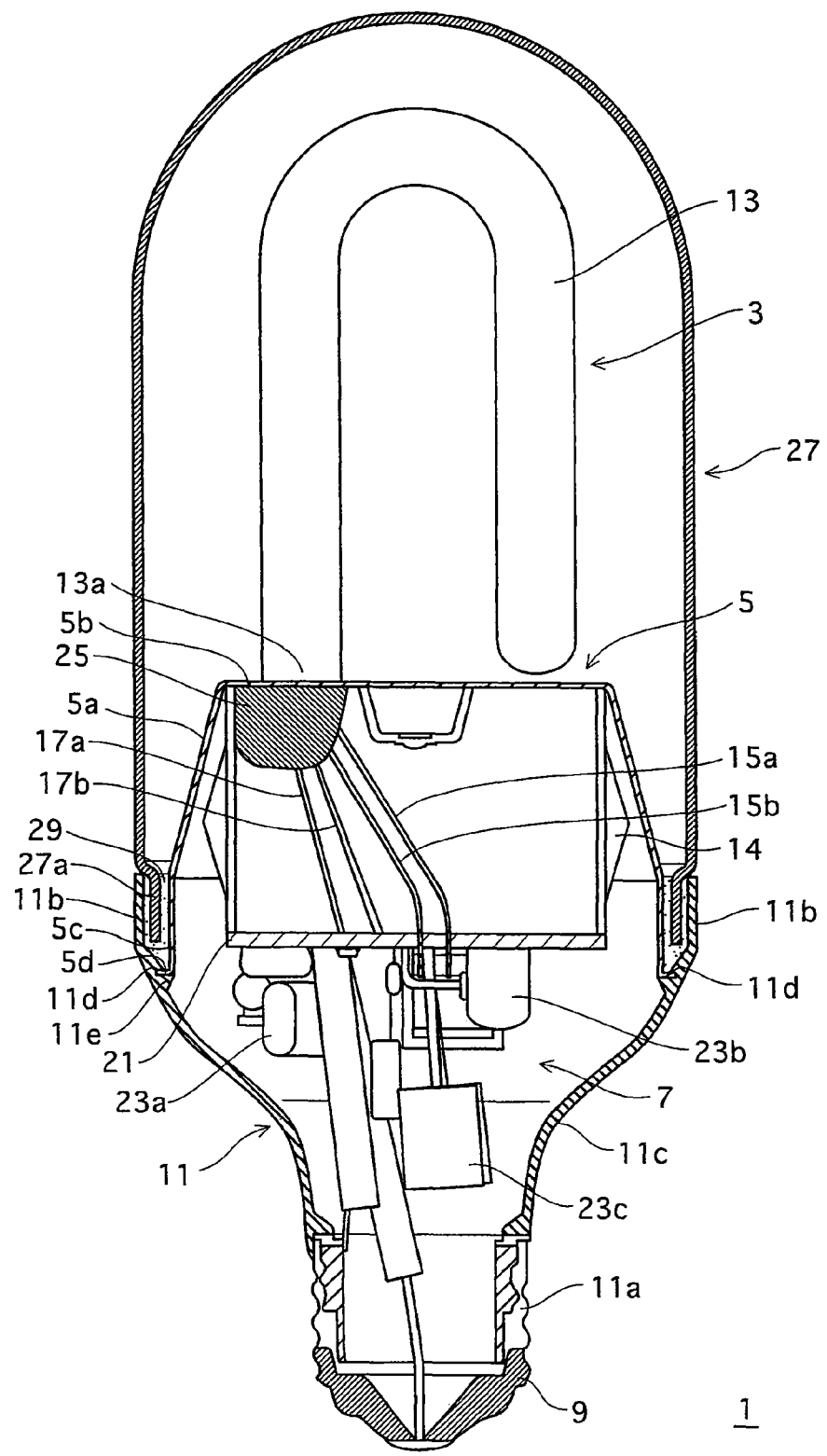
FIG. 3A is a view of a lamp 1 according to a first embodiment of the present invention, partly broken away to clearly show internal details.
Figure 3B:
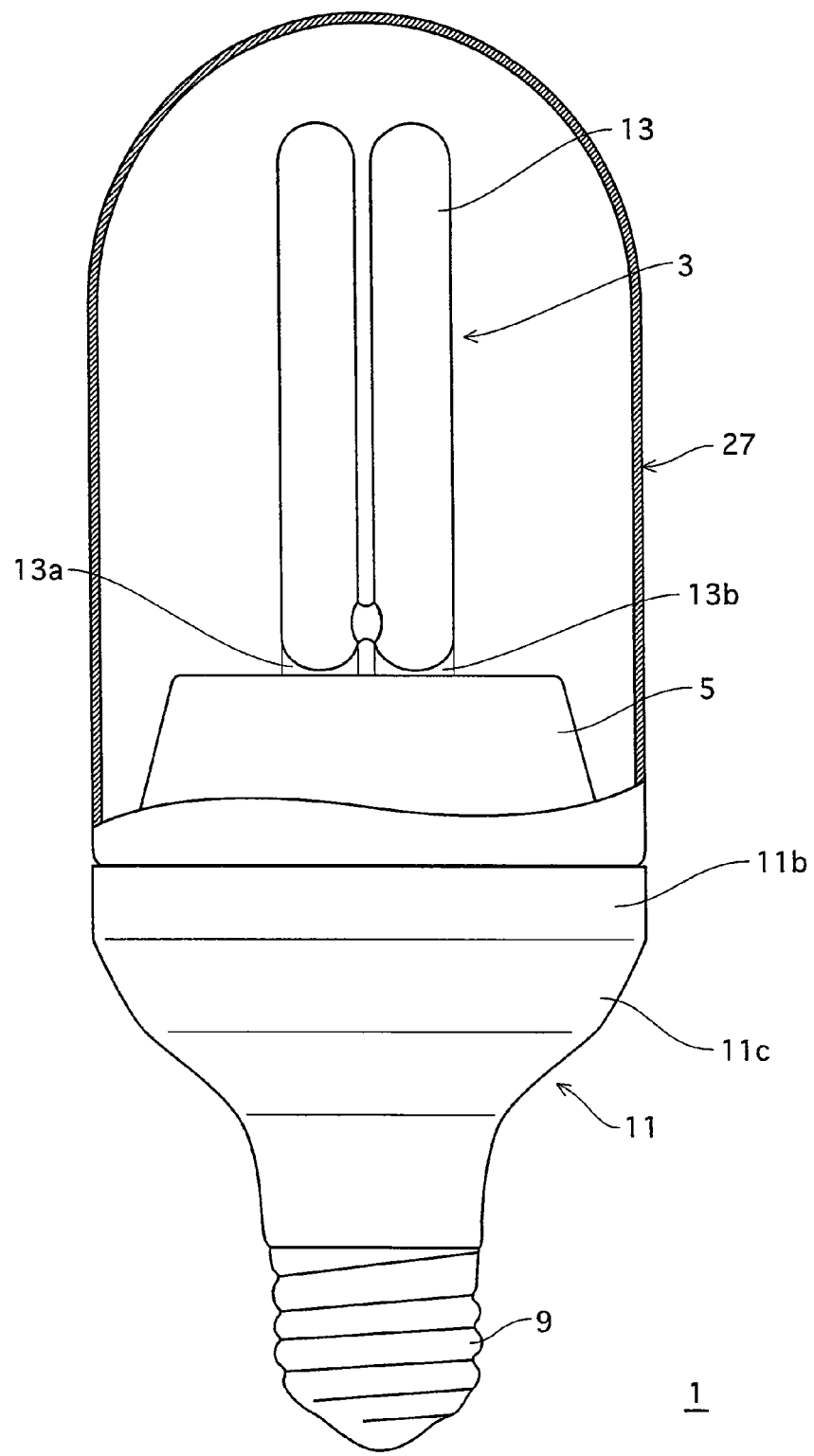
FIG. 3B is a view of the lamp 1, partly broken away to clearly show internal details.

FIGS. 3A and 3B illustrate a lamp according to a first embodiment of the present invention. FIGS. 3A and 3B are partly broken away to clearly show internal details.

As illustrated in FIGS. 3A and 3B, the lamp 1 includes an arc tube 3 (equivalent to the low-pressure mercury discharge tube of the present invention) having a curved discharge path formed therethrough, a holder 5 for holing the arc tube 3, a lighting unit 7 for lighting the arc tube 3, and a case 11. The case 11 has a base 9 attached to one end and houses the lighting unit 7 therein.

A tube body 13 of the arc tube 3 is composed of two U-shaped glass tubes connected together in a manner to enclose space to be a discharge path. The tube body 13 has a pair of electrodes (not illustrated) sealed one at each end 13a and 13b thereof. Naturally, the ends 13a and 13b correspond to the ends of the discharge path.

The tube body 13 of the arc tube 3 is formed in the following manner. First, two glass tubes (with outside diameter 12 mm, for example) each of which is closed at one end and open at the other end are prepared. Each glass tube is bent into U-shape and bridge-connected to each other at a position near the respective closed ends. The inner surface of the tube body 13 is coated with a phosphor layer.

Note that the tube body 13 may be additionally provided with a protective layer formed between the inner surface and the phosphor layer. In addition, the ends 13a and 13b of the tube body 13 are equivalent to the ends of the arc tube 3. Thus, the reference numerals "13a" and "13b" are also used to denote the ends of the arc tube 3.

Each electrode is composed of a filament coil and a pair of lead wires across which the filament coil is held. The electrodes are attached to the tube body 13 by, for example, pinch-sealing the respective ends (13a and 13b) of the tube body 13, with each filament coil inserted and relatively positioned into the tube body 13.

Portions of the lead wires of each electrode are sealed at the end 13a or 13b of the tube body 13. In addition, the portions of each electrode opposite to a respective filament coil extend from the end 13a or 13b of the arc tube 3 (tube body 13) as illustrated in FIG. 3A. In the figure, the reference numerals "15a" and "15b" denote the lead wires extending from the end 13a, whereas "17a" and "17b" denote the lead wires extending from the end 13b.

The distance between the electrodes (i.e. the filament coils) in the discharge path (discharge path length) is, for example, 330 mm.

At the end 13a of the tube body 13, a thin tube (not illustrated) is also enclosed along with the electrode. The thin tube is used to evacuate the tube body 13 and to fill the tube body 13 with buffer gas and the like, after the electrodes are sealingly attached. The thin tube is then sealed, for example, by chipping-off.

The arc tube 3 is filled, via the thin tube 19, with mercury (Hg) acting as a luminescent material, and a rare gas (for example, argon (Ar), neon (Ne) or a mixed gas of the two (Ar+Ne)) acting as a buffer gas.

The holder 5 is a bottomed tube having an end wall 5b, which is the bottom, a cylindrical portion 5c, and a tapered portion 5a connecting the end wall 5b and the cylindrical portion 5c. The tapered portion 5a is externally inclined in the direction away from the end wall 5b.

The holder 5 is made of resin such as PET (polyethylene terephthalate). The end wall 5b has insertion holes through which the ends 13a and 13b of the arc tube 3 are inserted into the holder 5.

The arc tube 3 is held in place relatively to the holder 5, with the ends 13a and 13b inserted into the holder 5 through the insertion hole described above and bonded to the inner surfaces of the holder 5 by adhesive (for example, silicon resin) 25.

Since the tapered portion 5a of the holder 5 is thin, a plurality of ribs 14 are formed at circumferentially spaced locations.

The circuitry of the lighting unit 7 will be described later. The lighting unit 7 includes a substrate 21 and a plurality of electronic components 23a, 23b, and 23c disposed and connected on the substrate 21. Specifically, the electronic component 23a, 23b, and 23c are a capacitor, a switching element, and a resistor, respectively.

The lighting unit 7 is attached to the holder 5, with the ribs 14 supporting the main surface of the substrate 21 facing toward the arc tube 3 and latching pawls (not illustrated) engaging the edges of the substrate 21.

The case 11 is in a funnel shape and has a small diameter portion 11a, a large diameter portion 11b, and an intermediate portion 11c. The large diameter portion 11b is diametrically larger than the small diameter portion 11a. The intermediate portion 11c connects the small and large diameter portions 11a and 11b and thus gradually extends in diameter from the small diameter portion 11a toward the large diameter portion 11b. The case 11 is made a resin, such as PBT (polybutylene terephthalate).

To the inner circumferential surface of the large diameter portion 11b of the case 11, the cylindrical portion 5c of the holder 5 is attached. To the outer surface of the small diameter portion 11a of the case 11, the base 9 is attached. In this embodiment, the large diameter portion 11b of the case 11 is fitted to cover the cylindrical portion 5c of the holder 5.

The base 9 is, for example, so-called a screw base (Edison base) composed of a metal tube having a screw-threaded wall. It should be naturally appreciated, however, that the base 9 is not limited to the screw base and may be a pin base, for example.

The lamp 1 according to the present embodiment includes a globe 27 housing the arc tube 3 therein.

The globe 27 is made of, for example, glass or acrylic and has a D-type shape. As illustrated in FIG. 3, the globe 27 has an open-end 27a and the rim of the open end 27a is inserted in a circumferential clearance formed between the large diameter portion 11b of the case 11 and the cylindrical portion 5c of the holder 5.

In this embodiment, the holder 5, the case 11, and the globe 27 are attached to one another through latching engagement and adhesion between the holder 5 and the case 11. To be more specific, the holder 5 has latching pawls 5d formed on the edge of the cylindrical portion 5c, whereas the case 11 has latching projections 11d inwardly extending from the inner surface thereof. The latching engagement is made between the latching pawls 5d of the holder 5 and the latching projections 11d of the case 11. In addition, the adhesion between the holder 5 and the case 11 is achieved with adhesive 29 supplied to fill the clearance formed between the cylindrical portion 5c of the holder 5 and the large diameter portion 11b of the case 11. With this arrangement, the case 11, the holder 5, and the globe 27 are fixed into a single piece.

Note that the case 11 has stoppers 11e formed on the inner surface thereof for preventing the holder 5 from sliding into the case 11 any farther. In addition, the plurality of latching pawls 5d, latching projections 11d, and stoppers 11e are provided at circumferentially intervals on the holder 5 or the case 11. The total numbers of the respective components may be four, for example.

2. Circuitry of Lamp

Figure 4:
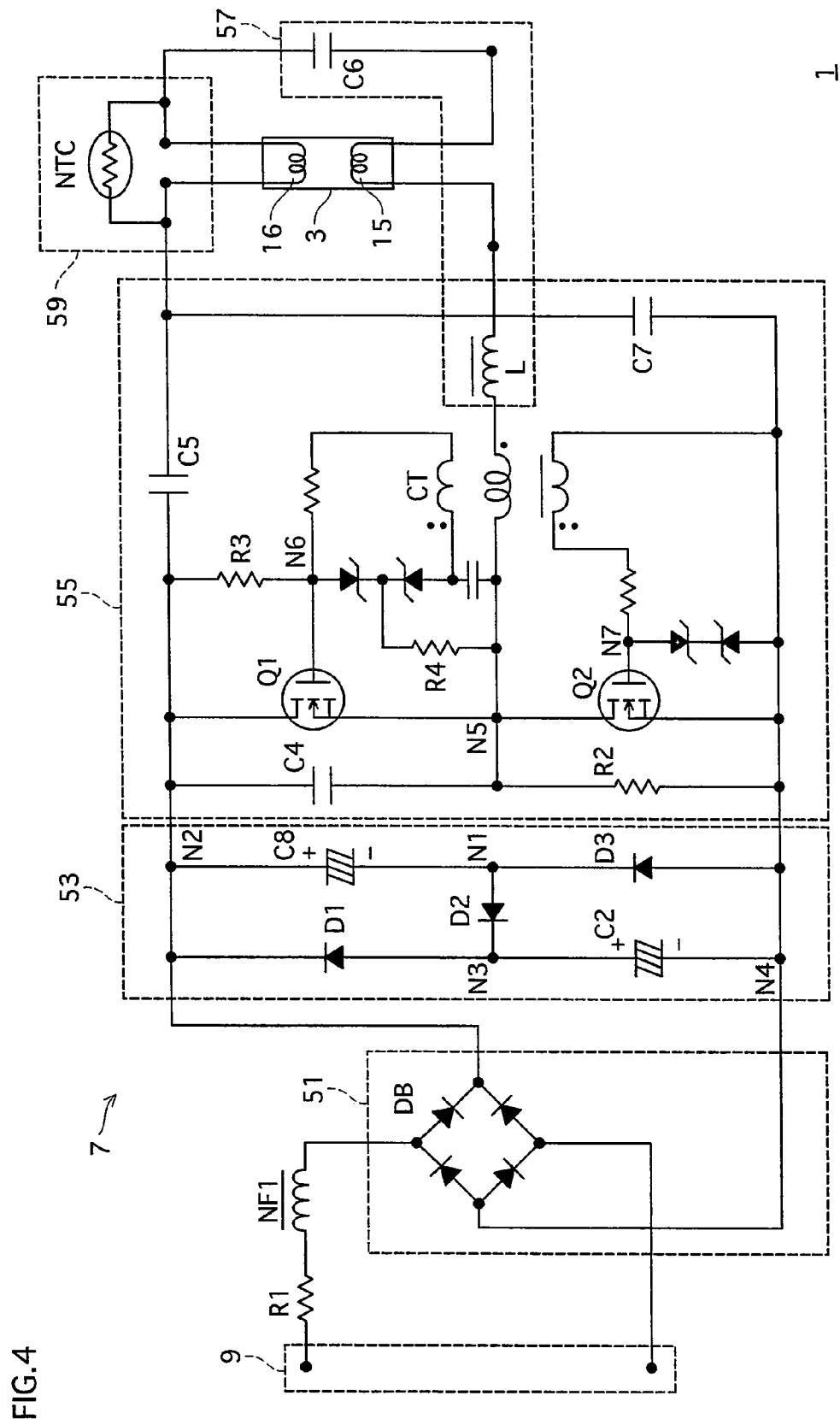
FIG. 4 is a circuit diagram of the lamp 1 that includes a lighting unit 7.

FIG. 4 is a circuit diagram of the lamp 1 that includes the lighting unit 7.

The lighting unit 7 is composed mainly of a rectifier circuit 51, a smoothing circuit 53, an inverter circuit 55, a resonance circuit 57, and a preheating circuit 59.

The rectifier circuit 51 is for rectifying, which is a process of converting commercial low-frequency alternating current voltage (equivalent to the alternating current voltage of the present invention) into direct current voltage. The rectifier circuit 51 in this embodiment is of a full-wave rectification type and includes four diodes constituting a bridge diode DB.

The smoothing circuit 53 is for smoothing the rectified direct current voltage. The smoothing circuit 53 in this embodiment is so-called a partial smoothing circuit and is composed of three diodes D1, D2, and D3 and two smoothing capacitors C2 and C8.

The three diodes D1, D2, and D3 are serially connected, so that the forward direction of each diode coincides the direction from the negative terminal toward the positive terminal of the rectifier circuit 51. The smoothing capacitor C8 is connected between nodes N1 and N2. The node N1 is at the anode terminal of the diode D2, which is the second one of the serially connected three diodes D1, D2, and D3. The node N2 is at the positive terminal of the rectifier circuit 51. The smoothing capacitor C2 is connected between nodes N3 and N4. The node N3 is at the cathode terminal of the diodes D2, which is the second one of the serially connected three diodes D1, D2, and D3. The node N4 is at the negative terminal of the rectifier circuit 51.

For each of the smoothing capacitors C2 and C8, a capacitor having the electrostatic capacity of 1.0 µF and the rated voltage of 450V is employed. For each of the diodes D1, D2, and D3, a diode of the 1 A 400V standard is employed.

Figure 5:
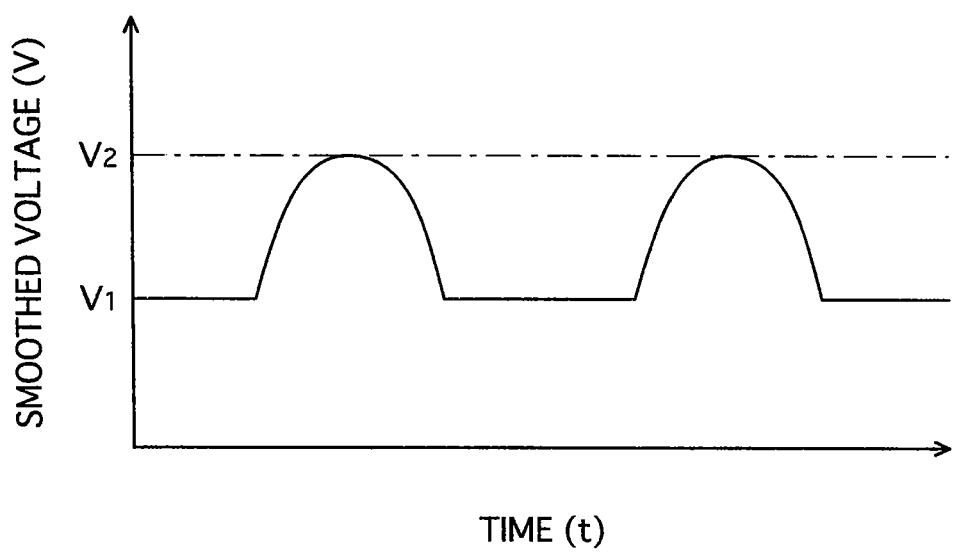
FIG. 5 is a chart illustrating the waveform of output voltage of a smoothing circuit.

FIG. 5 is a chart illustrating the waveform of output voltage of the smoothing circuit.

By connecting the diodes D1, D2, and D3 and the smoothing capacitors C2 and C8 as illustrated in FIG. 4, the smoothing circuit 51 outputs to inverter circuit 55 partially smoothed direct current voltage as illustrated in FIG. 5. More specifically, the smoothing circuit 51 converts the rectified voltage into direct current voltage by smoothing portions of the rectified voltage below a predetermined first voltage value V1. In this embodiment, the smoothing capacitors C2 and C8 are identical in specifications. Thus, a second voltage value V2 illustrated in FIG. 5 is approximately equal to double of the first voltage value V1.

Referring back to FIG. 4, the lighting unit 7 is connected to a commercial power source via the base 9. In addition, a resistor R1 and a coil NF1 are connected between the base 9 and the rectifier circuit 51, more specifically, to the negative terminal of the rectifier circuit 51. The resistor R1 is for suppressing rush current, whereas the coil NF1 is for noise filtering.

The inverter circuit 55 is connected to the output terminal of the smoothing circuit 53 and includes two switching elements. The switching elements are alternately turned ON, so that a high-frequency voltage is supplied to the arc tube 3.

The inverter circuit 55 in this embodiment is of a so-called half-bridge type and includes a pair of FETs Q1 and Q2 (which are equivalent to the switching elements of the present invention) and two coupling capacitors C5 and C7. For each of the coupling capacitor C5 and C7, a capacitor having the electrostatic capacity of 100 nF and the rated voltage of 400V is employed.

A starting circuit composed of resistors R2, R3, and R4 starts up the inverter circuit 55 (i.e., switching of the FETs Q1 and Q2). The FETs Q1 and Q2A are turned ON and OFF using the current transformer CT.

Now, the following describes the FETs Q1 and Q2, the starting circuit, and the current transformer CT.

The FETs Q1 and Q2 are both N-channel FETs. The FETs Q1 and Q2 are connected in parallel to the smoothing circuit 53 with the source of the FET Q1 connected at a node N5 to the drain of the FET Q2. In addition, the drain of the FET Q1 and the source of the FET Q2 are connected to the positive terminal and the negative terminal of the smoothing circuit 53, respectively.

The resistors R3, R4, and R2 of the starting circuit are serially connected in the stated order from the positive terminal of the smoothing circuit 53. The node N5 between the FETs Q1 and Q2 is connected to a node between the resistors R4 and R2.

The resistor R4 is connected to the current transformer CT at the terminal closer to the node N5. The current transformer CT includes one primary coil and two secondary coils and induces a voltage responsive to the magnitude and direction of load current flowing through the primary coil. In this embodiment, the primary coil of the current transformer CT is connected to the node N5 and the resonance circuit 57. In addition, each secondary coil is connected at one end to the gate of a different one of the FETs Q1 and Q2 via nodes N6 and N7, respectively.

The resistor R3 is connected at one end to a node N6.

With the connection described above, when a voltage between the nodes N5 and N6 reaches a set voltage value, the FET Q1 is turned ON to start switching operation. Once the switching operation starts, the FETs Q1 and Q2 alternately turned ON/OFF in response to the voltage induced in the secondary coils of the current transformer CT.

More specifically, during the time the FET Q1 is ON, electric current flows through a later-described choke coil L, the arc tube 3, and the like to induce a voltage in the secondary coils. As soon as the FET Q1 is turned OFF, the FET Q2 is turned ON. Similarly, the electric current flowing during the time the FET Q2 is ON induces a voltage in the secondary coils. As soon as the FET Q2 is turned OFF, the FET Q1 is turned ON.

Note that the resistors R2, R3, and R4 included in the starting circuit are a 440 kΩ resistor, a 7.8 MΩ resistor, and a 100 kΩ resistor, respectively.

The resonance circuit 57 is composed of the choke coil L and a resonant capacitor C6 that are serially connected. The resonance circuit 57 feeds preheating current to the electrodes 14 and 16 (filament coils). In addition, the resonance circuit 57 amplifies the voltage across the electrodes 15 and 16. For the resonant capacitor C6, a capacitor having the electrostatic capacity of 1800 pF and the rated voltage of 800V is employed. For the choke coil L, a coil with an inductance of 2.3 mH is employed.

The preheating circuit 59 includes a negative temperature coefficient resistor NTC connected in parallel to the electrode 16. The negative temperature coefficient resistor NTC is for adjusting the electric current supplied to the electrodes at the power feed starting time. For the negative temperature coefficient resistor NTC, a 22☐ NTC numbered NTP05220LB1A0 (manufactured by Murata manufacturing Co., Ltd.) is employed.

3. Lamp Operation at 277 Volts

Figure 6:
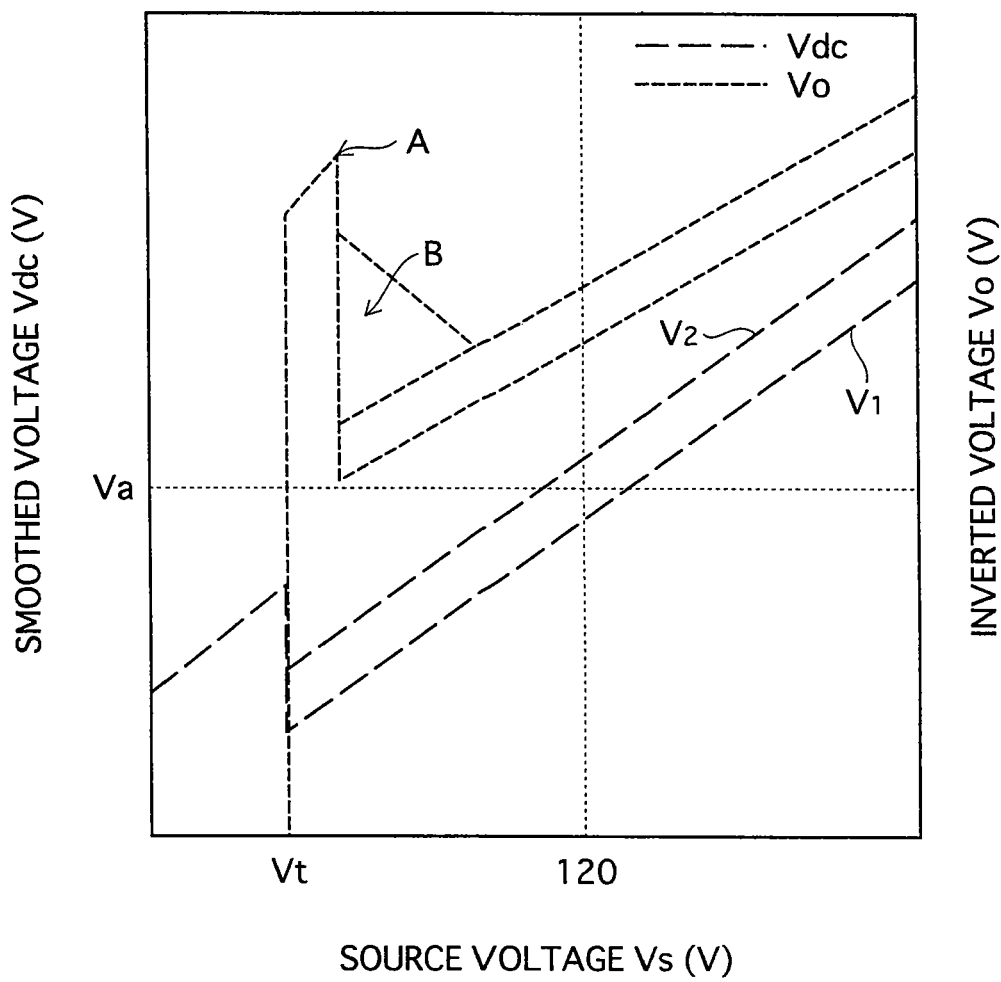
FIG. 6 is a view illustrating variation in output voltages of the smoothing circuit and an inverter circuit of the lamp 1 relative to a source voltage.

FIG. 6 is a view illustrating variation in the output voltages of the smoothing circuit and the inverter circuit relative to the source voltage, measured during the time from the power feed start to the illumination start.

With reference to FIGS. 4 and 6, the following briefly describes the lighting operation of the lamp 1 and the variation in the lamp voltage during the lighting operation. In this specification, the effective voltage fed to the lamp from the commercial power source is determined as the source voltage.

The alternating current voltage fed from the commercial power source to the lighting unit 7 via the base 9 is rectified by the rectifier circuit 51 and then partially smoothed by the smoothing circuit 53. As a result, the direct current voltage partially smoothed as illustrated in FIG. 5 is output to the inverter circuit 55.

The voltage output from the smoothing circuit 53 (hereinafter, simply "smoothed voltage Vdc") increases with the source voltage Vs as illustrated in FIG. 6, until the switching element Q1 of the inverter circuit 55 is started. During the increase, the electric current (direct current) flows through the resistors R3, R4, and R2 of the starting circuit.

With the increase of the source voltage Vs, the voltage between the nodes N5 and N6 increases and the voltage between the gate and source of the FET Q1 increases. When the source voltage Vs reaches a voltage value Vt illustrated in FIG. 6, the voltage between the gate and source of the FET Q1 reaches the threshold voltage (equally means the predetermined voltage mentioned above).

As a result, the inverter circuit 55 starts (more precisely, the FET Q1 is turned ON) and the output voltage of the inverter circuit 55 (hereinafter, simply "inverted voltage Vo") increases sharply, as illustrated with a broken line in FIG. 6. The electric current (direct current) at this time momentary flows into the smoothing circuit 53 via the FET Q1, the current transformer CT, the choke coil L, the electrode 15, the resonant capacitor C6, the negative temperature coefficient resistor NTC, and the coupling capacitor C7. At this time, the coupling capacitor C7 is charged.

As a result of the momentarily flowing electric current, a voltage is induced in the secondary coil of the current transformer CT. The induced voltage raises the gate voltage of the FET Q1, so that the FET Q1 stays ON. During the time the FET Q1 stays ON, the choke coil L and the coupling capacitor C7 build up energy, so that the electric current flowing through the current transformer CT eventually decreases.

With the decrease, the voltage across one of the secondary coils of the current transformer CT connected to the FET Q1 decreases, so that the FET Q1 is turned OFF. On the other hand, the voltage across the other secondary coil of the current transformer CT connected to the FET Q2 increases. As a result, the gate voltage of the FET Q2 increases and the FET Q2 is turned ON.

As described above, the FETs Q1 and Q2 alternately repeats ON and OFF. At the same time, with the increase of the source voltage Vs, the smoothed voltage Vdc and the inverted voltage Vo0 increase as illustrated in FIG. 6.

With the FETs Q1 and Q2 alternately tuned ON, electric current flows through the electrodes 15 and 16 of the arc tube 3 to heat the electrodes 15 and 16. During the time the FETQ1 is ON, electric current flows through a closed circuit formed by the FET Q1, the current transformer CT, the choke coil L, the electrode 15, the resonant capacitor C6, either of the electrode 16 and the negative temperature coefficient resistor NTC, and the coupling capacitor C5.

The resistance of the negative temperature coefficient resistor NTC varies in accordance with the temperature change resulting from the electric current flowing therethrough. Thorough the use of the variable resistance, the temperature of the electrodes 15 and 16 and the resonance frequency of the resonance circuit 57 are adjusted.

As a result, a dielectric breakdown occurs between the electrodes 15 and 16 of the arc tube 3, as indicated by the point A in FIG. 6. Thus, electric current starts to flow across the electrodes 15 and 16, so that the lamp 1 is illuminated. At this time, the electric current (lamp current) flows through the arc tube 3, so that the inverted voltage Vo sharply drops.

Thereafter, the lamp 1 repeats a cycle in which discharge is sustained and then the discharge fades out, as indicated by the region B in FIG. 6. During the repetition of discharge and fading-out, the inverted voltage Vo and the smoothed voltage Vdc increase on the whole with the increase of the source voltage Vs.

Figure 7:
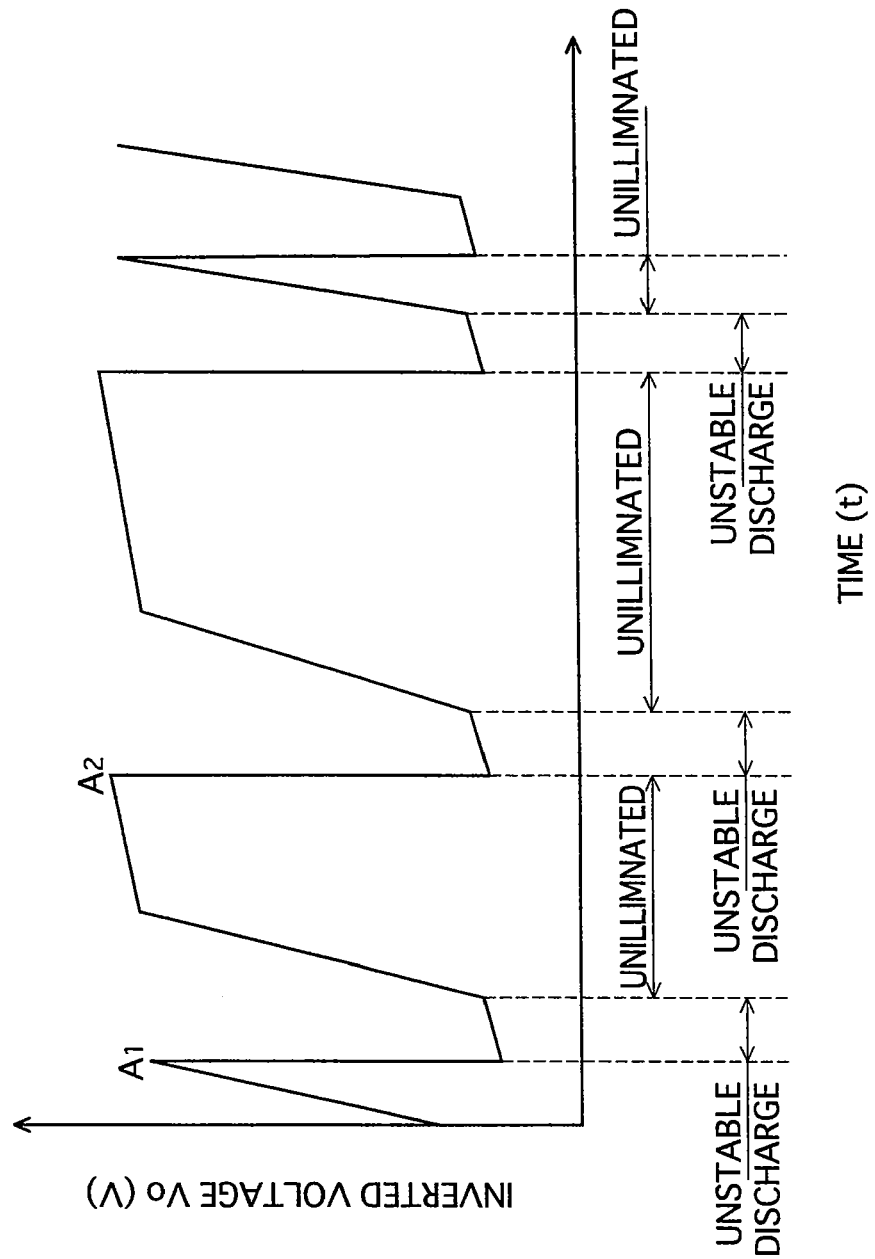
FIG. 7 is a view illustrating repetition of discharge and fading-out indicated by a region B in FIG. 6.

FIG. 7 is a view illustrating the repetition of discharge and fading-out indicated by the region B in FIG. 6.

As indicated by the region B, the inverted voltage Vo starts to rise first. When the inverted voltage Vo reaches the point A1, a dielectric breakdown occurs and thus discharge starts. Yet, since the inverted voltage Vo is low at this stage, the discharge is unstable and cannot be sustained. Eventually, the light goes out (fading-out of discharge).

In order to re-start discharge of the arc tube 3, the inverted voltage Vo increases. When the inverted voltage Vo reaches the point A2, a dielectric breakdown occurs again and discharge starts. Yet, the inverted voltage Vo is still low as described above. Thus, the discharge cannot be maintained and eventually fades out.

As described above, the cycle of discharge start, unstable discharge, and fading-out is repeated until the inverted voltage Vo increases and the smoothed voltage Vdc increases to the voltage value Va illustrated in FIG. 6. The voltage value Va is the minimum level of the smoothed voltage Vdc for allowing discharge to be stably sustained (hereinafter referred to simply as "sustaining voltage value"). With the smoothed voltage Vdc equal to or higher than the voltage value Va, the inverted voltage Vo is high enough for stable discharge of the lamp 1.

Then, during the stably sustained discharge, the smoothed voltage Vdc and the inverted voltage Vo increase with the increase of the source voltage Vs. Thus, the lamp 1 maintains stable discharge and operates normally, so that the intensity reaches a predetermined level when the source voltage Vs is 277V.

4. Lamp Operation at 120 Volts

Next, a description is given of a case where the 277V lamp 1 having the above structure is mistakenly used with a 120V lighting fixture.

Even when the lamp 1 designed to be operated at 277V is used with a lighting fixture for a 120V lamp, the lighting unit 7 operates basically in the same manner with normal operation with a 277 lighting fixture. It should be noted however, that the source voltage Vs applied to the lamp 1 is 120V.

The lighting unit 7 according to the first embodiment employs the smoothing circuit 53 for partial smoothing. As illustrated in FIG. 6, the voltage output by the smoothing circuit 53 to the inverter circuit 55 has been smoothed to fall between the first voltage value V1 and the second voltage value V2.

With the smoothing circuit 53, the discharge sustaining voltage Va falls between first and second voltage values V1 and V2 when the source voltage Vs is 120V.

Figure 8:
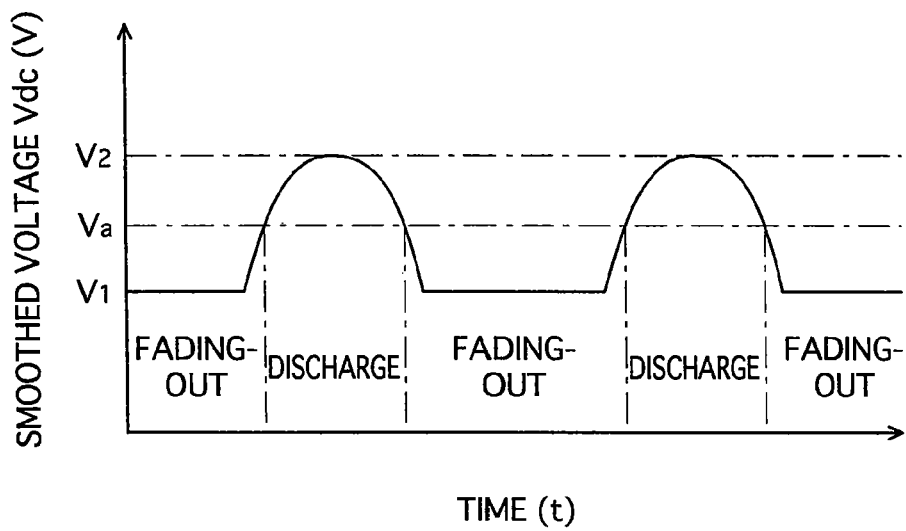
FIG. 8 is a chart of the waveform of a smoothed voltage Vdc output when the 277V lamp 1 is applied with the source voltage Vs of 120V.

FIG. 8 is a chart of the waveform of the smoothed voltage Vdc output when the 277V lamp is applied with the source voltage Vs of 120V.

In FIG. 8, the first voltage value V1 is a reference value for partial smoothing. The second voltage value V2 is the maximum voltage value output from the rectifier circuit 51. As described above, the smoothing capacitors C2 and C8 are identical, so that the first voltage value V1 is about half the second voltage value V2.

Thus, when the smoothed voltage Vdc is equal to or higher than the sustaining voltage value Va, the discharge of the arc tube 3 is sustained. On the other hand, when the smoothed voltage Vdc is below the sustaining voltage value Va, the discharge of the arc tube 3 fades out.

This is the condition where the lamp 1 repeats illumination and non-illumination, thereby causing flickering noticeable to human eye. Signaled by such flickering, it is reasonably expected that the user will realize that the 277V lamp 1 is mistakenly used for a 120V lamp.

Regarding the arc tube 3 according to the present embodiment, the dimensions including the glass tube diameter of the tube body 13 and the intra electrode distance are adjusted, so that the discharge sustaining voltage Va falls between the first and second voltage values V1 and V2.

5. Comparison with Conventional Example

Figure 1:
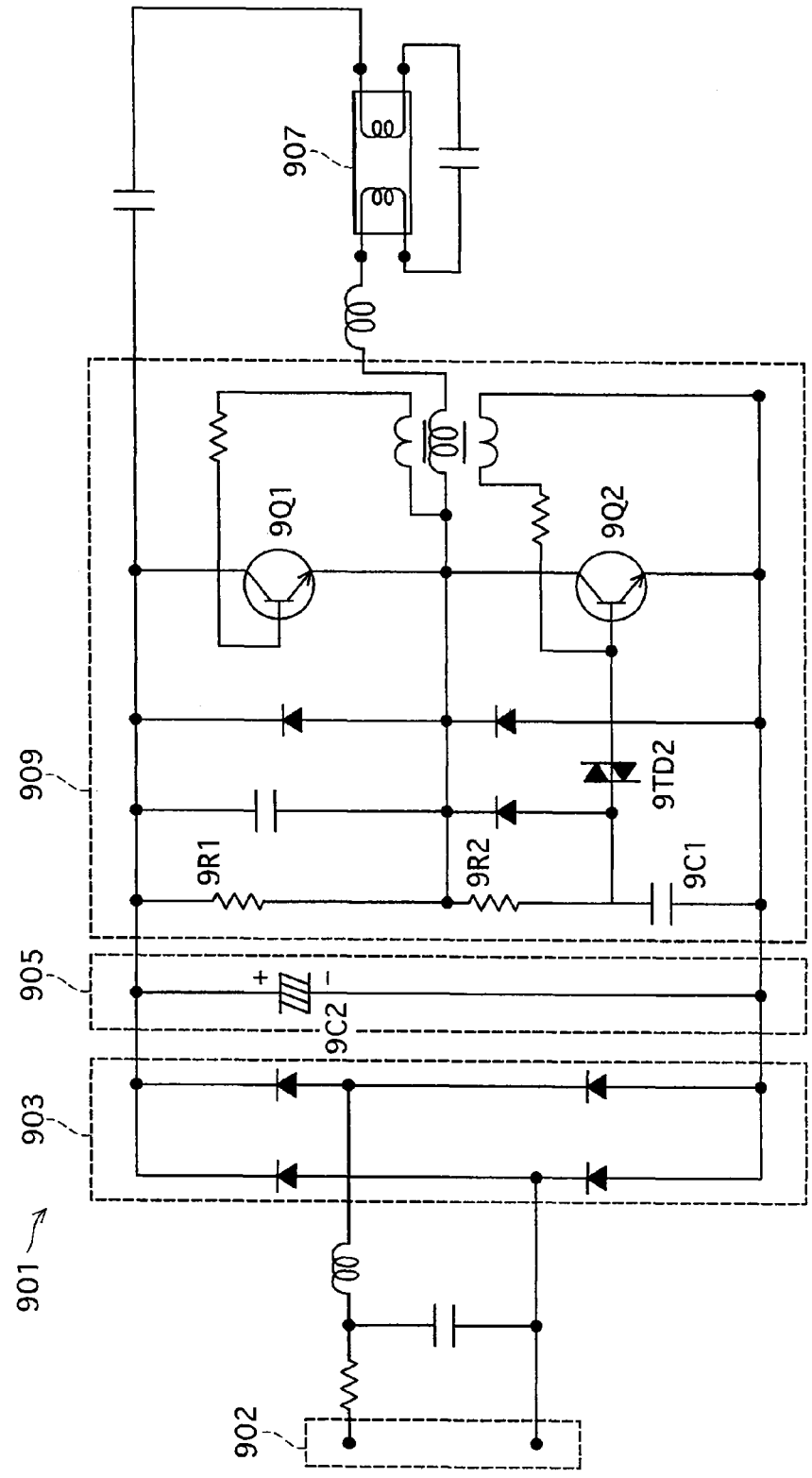
FIG. 1 is a circuit diagram of a lighting unit employed in a conventional lamp.
Figure 2:
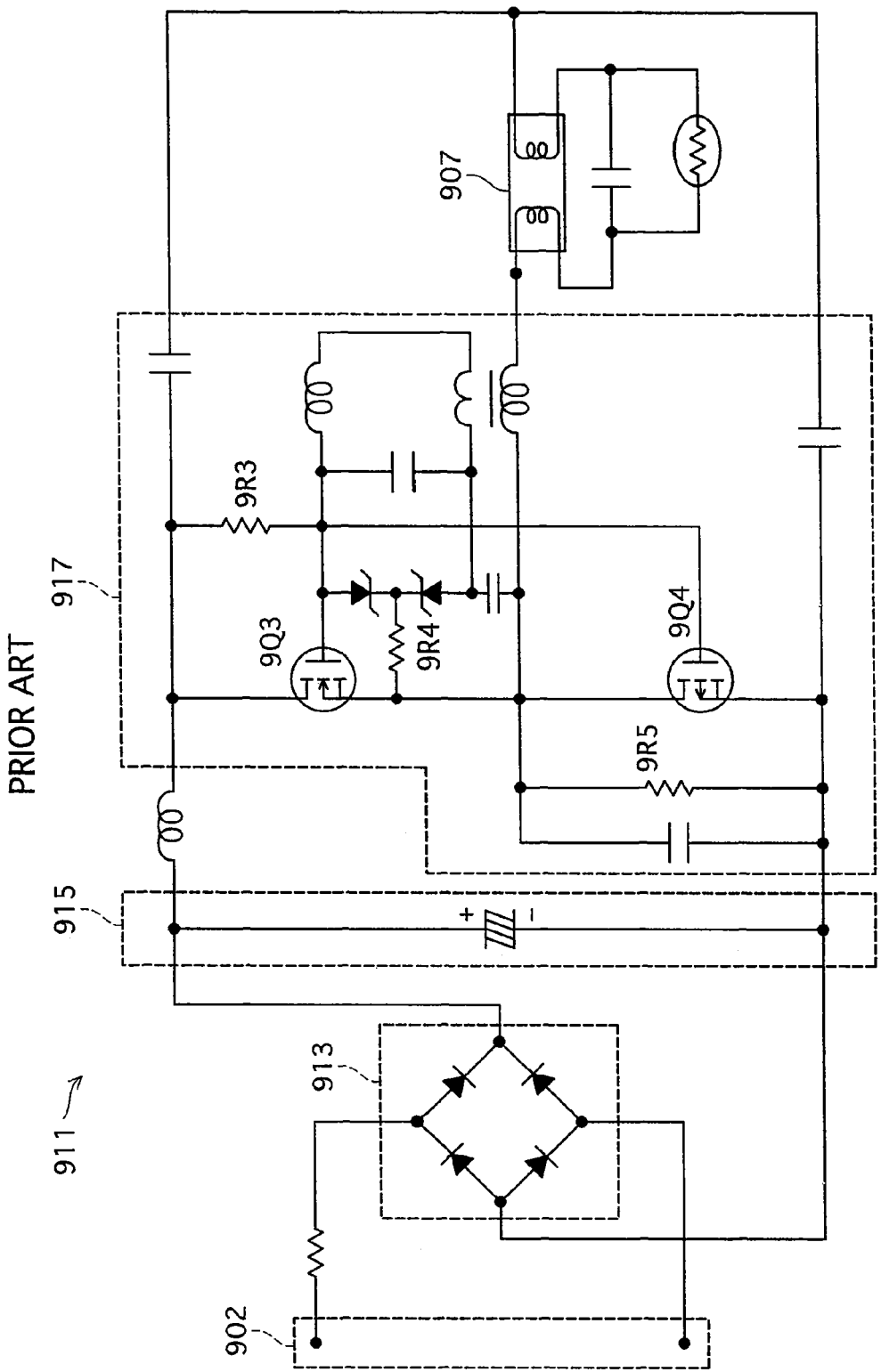
FIG. 2 is a circuit diagram of another lighting unit employed in a conventional lamp.

The following describes a 277V lamp (conventional example) having the lighting unit 901 illustrated in FIG. 1 is mistakenly used with a 120V lighting fixture. The conventional lighting unit 901 in FIG. 1 is basically identical to the lighting unit 7 illustrated in FIG. 4, except for the smoothing circuit. Note that the lamp 1 according to the present embodiment is referred to as a working example.

The conventional smoothing circuit 905 is for smoothing the entire pulsating-current voltage output from the rectifier circuit 903. On the other hand, the smoothing circuit 53 of the working example is a partial smoothing circuit for smoothing portions of the pulsating-current voltage output from the rectifier circuit 903. (See FIG. 5).

Figure 9:
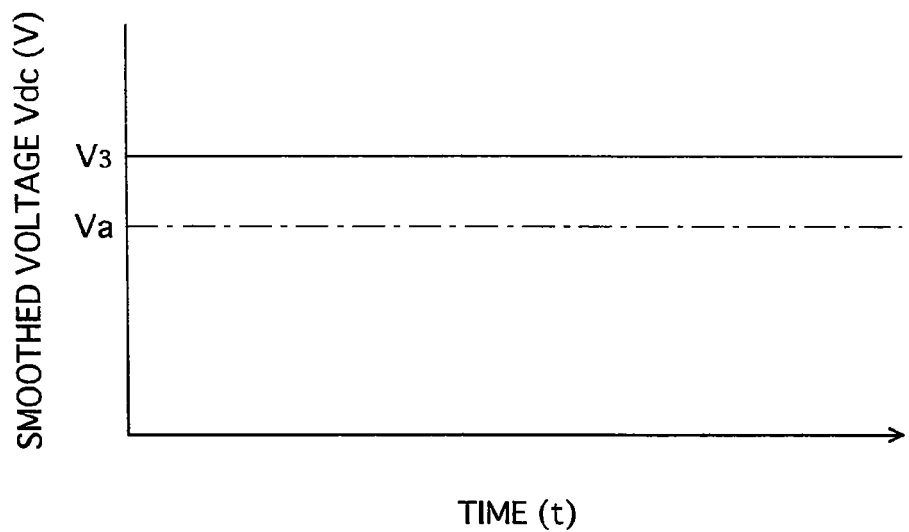
FIG. 9 is a chart illustrating the waveform of output voltage of a conventional smoothing circuit 905.

FIG. 9 is a chart illustrating the waveform of output voltage of the conventional smoothing circuit 905.

The smoothed voltage Vdc of the conventional example is approximately constant at the predetermined voltage value V3 throughout time t, as illustrated in FIG. 9.

Figure 10:
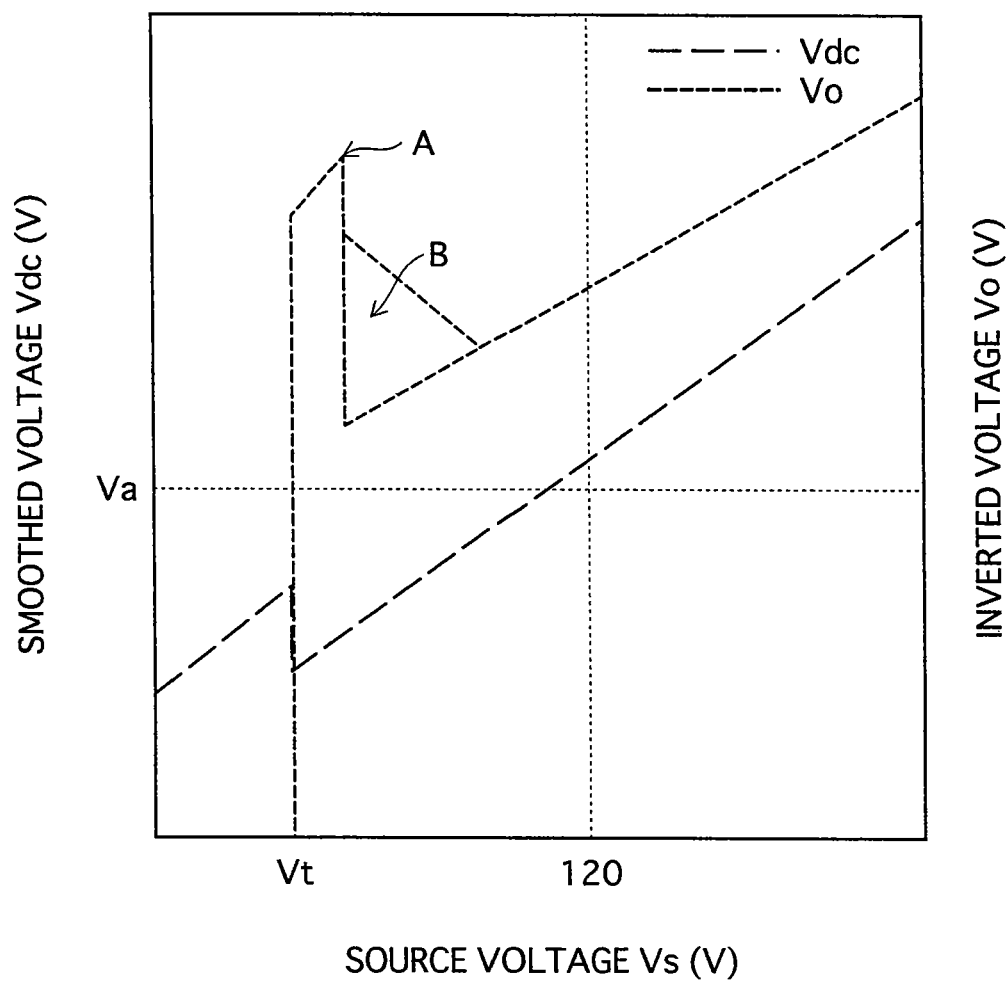
FIG. 10 is a chart indicating variations of the smoothed voltage Vdc and the inverted voltage Vo of a conventional lamp relative to the source voltage Vs.

FIG. 10 is a chart indicating variations of the smoothed voltage Vdc and the inverted voltage Vo relative to the source voltage Vs, measured during the time from the power feed start to the illumination start.

When alternating current voltage is fed from a commercial power source to the lighting unit 901 via the base 902, the rectifier circuit 903 rectifies the alternating current voltage and the smoothing circuit 905 converts the rectified alternating current voltage into substantially liner direct current voltage, as illustrated in FIG. 9. The resulting direct current voltage is then output to the inverter circuit 909.

The output voltage of the smoothing circuit 905 increases with the source voltage Vs, as illustrated in FIG. 10. During this time, the electric current (direct current) flows through the resistors 9R1 and 9R2 and the capacitor 9C1 that are included in the starting circuit.

When the source voltage Vs reaches the voltage value Vt illustrated in FIG. 10, the switching element 9Q2 is turned ON to start the inverter circuit 909. Eventually, a dielectric breakdown occurs in the arc tube 907 (at the point "A" in the figure).

Thereafter, the discharge and fading-out are repeated (indicated by the region B in the figure). During the repetition, the smoothed voltage Vdc and the inverted voltage Vo increase with the source voltage Vs. When the source voltage Vs reaches 120V, the smoothed voltage Vdc is equal to or higher than the discharge sustaining voltage Va, thereby allowing discharge to be stably sustained.

As described above, even when mistakenly operated at the source voltage Vs of 120V, the conventional example stably sustains discharge for a while. This makes it difficult for the user to realize that the lamp is operated improperly. As a consequence, it is likely that the user will misunderstand that various problems occurred in due course are because of the inferior quality of the lamp.

6. Modification 1 of First Embodiment

According to the first embodiment described above, the lighting unit 7 includes the smoothing circuit 53 for partial smoothing. In addition, the arc tube 3 and the smoothing capacitors C2 and C8 are so designed that the discharge sustaining voltage Va falls between the maximum value (V2 in FIG. 5) and the minimum value (V1 in FIG. 5) of the smoothed voltage Vdc.

With this structure, when the lamp 1 that is for operation at 277V is mistakenly used with a lighting fixture that is for 120V lamps, the smoothed voltage Vdc output from the smoothing circuit 53 falls below and rises above the discharge sustaining voltage Va. This causes the arc tube 3 to repeat ON and OFF, which provides a noticeable indication to the user that the lamp 1 is not operated normally.

Thus, the effect of the first embodiment is ensured as long as the lighting unit is structured to vary its output to repeatedly rise above and fall below the voltage value at which a discharge of the arc tube 3 is stably sustained when the source voltage Vs is 120.

Thus, smoothing circuits other than the one for partial smoothing may be employed. For example, a smoothing circuit may be a so-called active smoothing circuit that is composed of one or more electrolytic capacitors each with a small capacitance or that uses electric charge fed from the inverter circuit for smoothing.

The following describes a modification 1 of the first embodiment in which a smoothing circuit using small capacitance is employed.

Figure 11:
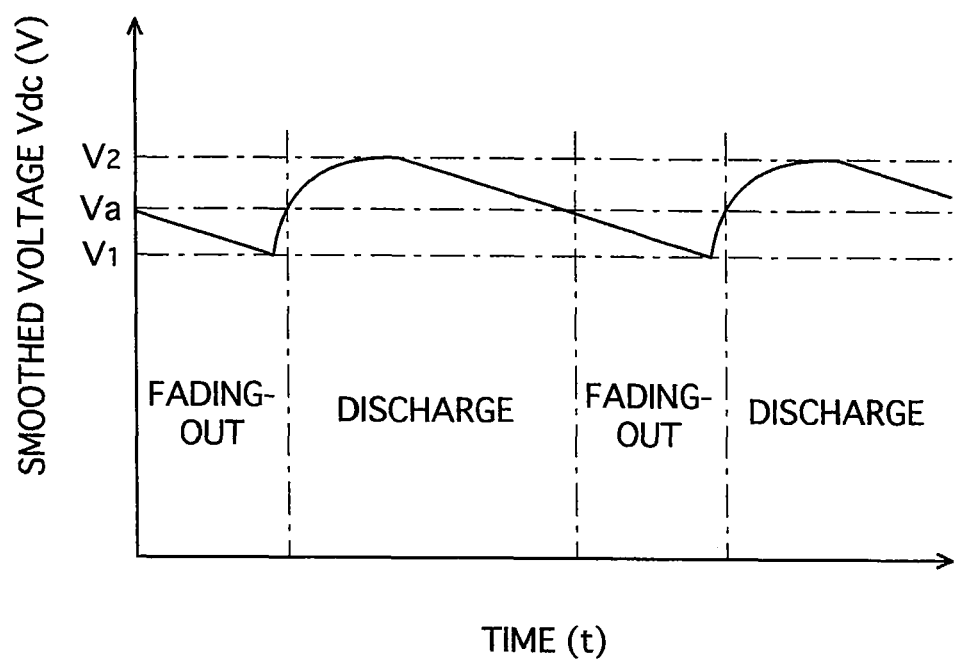
FIG. 11 is a chart indicating variation of the smoothed voltage Vdc output from a smoothing capacitor of a modification 1 when applied with the source voltage Vs of 120V

FIG. 11 is a chart indicating variation of the smoothed voltage Vdc output from the smoothing capacitor of the modification 1 when applied with the source voltage Vs of 120V.

As illustrated in FIG. 11, the smoothed voltage Vdc output to the inverter circuit (55) falls between the first and second voltage values V1 and V2. Thus, if the discharge sustaining voltage Va of the arc tube also falls between the first voltage V1 and the second voltage V2 as illustrated in FIG. 11, the discharge is sustained when the smoothed voltage Vdc is equal to or hither than the discharge sustaining voltage Va. On the other hand, when the smoothed voltage Vdc is below the discharge sustaining voltage Va, the discharge cannot be sustained and fades out.

That is to say, the smoothing circuit composed of a small capacitance electrolytic capacitor is capable of casing a lamp to repeat discharge and fading-out, if the lamp is a 277V lamp mistakenly used for a 120V lamp.

Specifically, to practice the modification 1, a 2.2 μF/450V capacitor may be employed as the smoothing capacitor.

7. Modification 2 of First Embodiment

In the case where the smoothing circuit 53 according to the first embodiment described above is employed, fading-out of discharge occurs if the first voltage value V1 of the smoothed voltage Vdc is below the discharge sustaining voltage Va. In other words, the second voltage value V2 may be higher or lower than the discharge sustaining voltage Va as long as the first voltage value V1 is below the discharge sustaining voltage Va.

The following describes a modification 2 of the first embodiment. The modification 2 relates to the case where the second voltage value V2 is lower than the discharge sustaining voltage Va. Note that the first embodiment above relates to the case where the second voltage value V2 is higher than the sustaining voltage Va.

Figure 12:
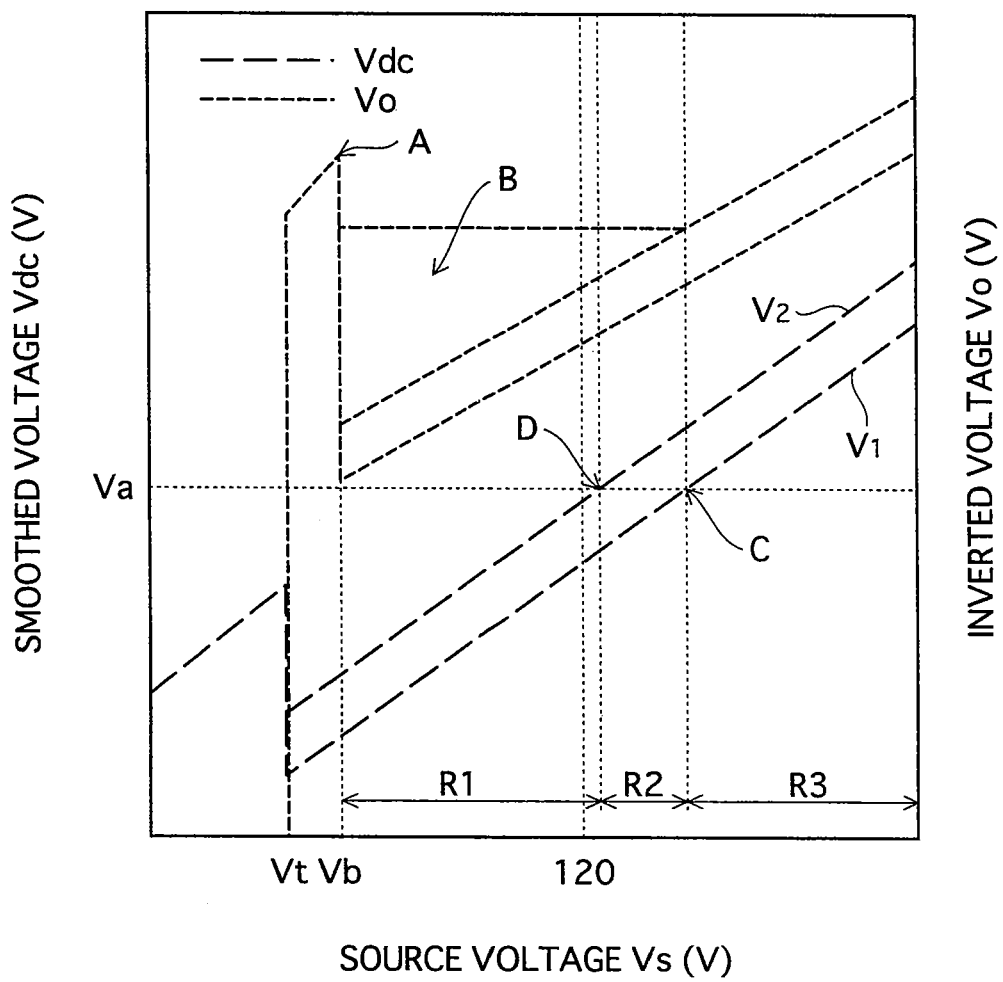
FIG. 12 is a chart indicating variations of the smoothed voltage Vdc and the inverted voltage Vo of a lamp according to a modification 2 relative to the source voltage Vs.

FIG. 12 is a chart indicating variations of the smoothed voltage Vdc and the inverted voltage Vo of the lamp according to the modification 2 relative to the source voltage Vs, measured during the time from power feed start to illumination start.

With the lamp 1 according to the modification 2, the first and second voltage values V1 and V2 of the smoothed voltage Vdc is set to fall below the discharge sustaining voltage Va when the source voltage Vs is 120V.

Such setting is made by modifying the resonance circuit 57 illustrated in FIG. 4. More specifically, the inductance of the choke coil L is made smaller and the capacitance of the resonant capacitor C6 is made larger, so that the inverted voltage Vo is lowered. Alternatively, the diameter of the arc tube and/or the length of the discharge path may be adjusted.

The following describes operation of the lamp according to the modification 2 by applying the source voltage Vs of 277V.

When the power feed to the lamp starts and the source voltage Vs reaches the voltage value Vt, the inverter circuit (55) is activated. Thus, as illustrated in FIG. 12, the inverted voltage Vo increases sharply and a dielectric breakdown in the arc tube (3) occurs (at the point A in FIG. 12).

After the first dielectric breakdown, the lamp repeats discharge and fading-out until the first voltage value V1 of the smoothed voltage Vdc exceeds the discharge sustaining voltage Va (at the point C in FIG. 12). In FIG. 12, the region B indicates the repetition of discharge and fading-out. Flickering resulting from the repetition of dielectric breakdown and discharge fading-out is more noticeable with the source voltage Vs within in the range indicated as R1, and less noticeable with the source voltage Vs within the range indicated as R2 in FIG. 12.

The range R1 is from the point at which the source voltage Vs reaches the dielectric breakdown voltage Vb to the point D at which the second voltage value V2 reaches the discharge sustaining voltage Va. With the source voltage Vs in the range R1, although a dielectric breakdown in the arc tube (3) occurs, the discharge cannot be sustained but fades out immediacy. This is because the smoothed voltage Vdc is lower than the discharge sustaining voltage Va. The fading-out of discharge immediately after deictic breakdown causes noticeable flickering.

The range R2 is from the point D at which the second voltage value V2 reaches the discharge sustaining voltage Va to the point C at which the first voltage value V1 reaches the discharge sustaining voltage Va. With the source voltage Vs in the range R2, the second voltage value V2 is higher than the discharge sustaining voltage Va. Thus, the lamp stays illuminated while the smoothed voltage Vdc is higher than the discharge sustaining voltage Va. With the source voltage Vs in the range R2, flickering is less noticeable (i.e. periods during which the lamp stays unilluminated are longer) than the flickering with the source voltage Vs in the range R1 described above.

As a consequence, if the lamp according to the modification 2 is mistakenly used with a 120V lighting fixture for the source voltage Vs is similar to the 120V lamp as illustrated in FIG. 12. The source voltage Vs of 120V falls within the range R1, thus the resulting flickering of the lamp is unnoticeable. That is to say, when mistakenly operated at 120V, the lamp according to the modification 2 flickers noticeably as described above. This provides a noticeable indication to the user that the lamp is not properly used.

Note that the lighting unit according to the modification 2 employs a partial smoothing circuit. Yet, a similar effect is achieved by employing an active smoothing circuit described above in the modification 1.

<Second Embodiment>

According to the first embodiment, the smoothing circuit 53 is for partial smoothing. According to a second embodiment of the present invention, however, discharge of the arc tube does not occur when the source voltage is 120V.

(1) Switching Operation

The following describes a first example of the second embodiment (hereinafter, second embodiment 1) directed to a lamp of which switching elements would not operate when the source voltage Vs is 120V.

Figure 13:
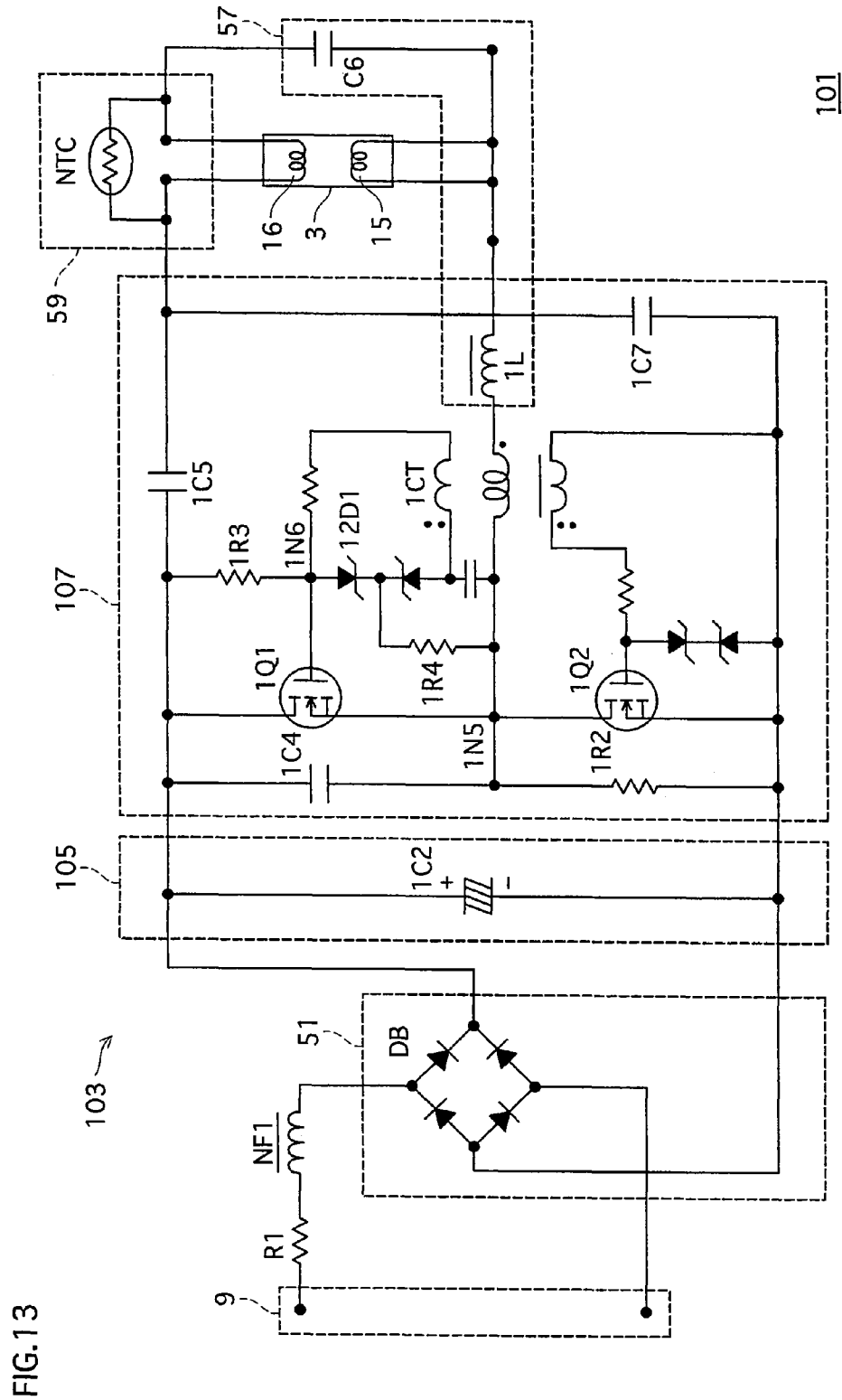
FIG. 13 is a circuit diagram of a lamp 101 including a lighting unit 103 according to a second embodiment 1.

FIG. 13 is a circuit diagram of a lamp 101 including a lighting unit 103 according to the second embodiment 1.

The lighting unit 103 of the second embodiment 1 differs from the lighting unit 7 according to the first embodiment in a smoothing circuit 105 and an inverter circuit 107.

The smoothing circuit 105 is composed of one smoothing capacitor 1C2. In addition, the inverter circuit 107 includes a starting circuit that is composed of resistors R2, R3, and R4 having different specifications from the resistors used in the lighting unit 7. More specifically, the resistors 1R2, 1R3, and 1R4 in the inverter circuit 107 are such that the voltage between the gate and source of FET 1Q1 (the voltage between nodes 1N5 and 1N6) is below the starting voltage when the source voltage Vs applied is 120V.

In practice, a Zener diode 1ZD1 is serially connected between the resistors 1R3 and 1R4. Thus, the Zener diode 1ZD1 must be taken into consideration.

The following is a specific description of components including the resistors 1R2, 1R3, and 1R2.

The resistors 1R3, 1R4, and 1R2 in the starting circuit according to the second embodiment are a 7.8 MΩ resistor, a 100 kΩ resistor, and a 440 kΩ resistor, respectively. The potential difference of the Zener diodes 1ZD is 0.3V. The starting voltage of the FETs 1Q1 and 1Q2 is 2.5V.

With the starting circuit employing the resistors 1R3, 1R4, and 1R2, the FETs 1Q1 and 1Q2, and the Zener diode 1ZD described above, the FETs 1Q1 and 1Q2 start when the source voltage Vs is 129.7V.

Figure 14:
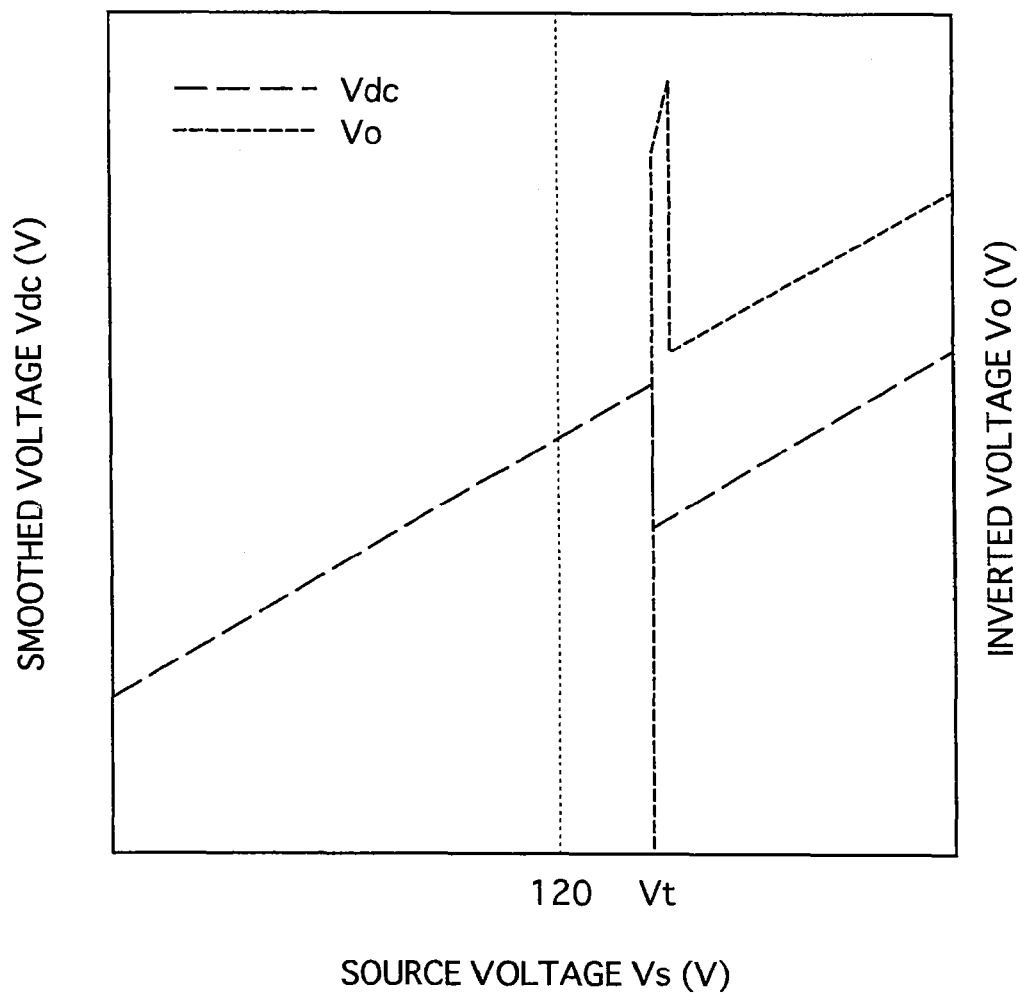
FIG. 14 is a chart indicating variations of the smoothed voltage Vdc and the inverted voltage Vo of the lighting unit 103 relative to the source voltage Vs.

FIG. 14 is a chart indicating variations of the smoothed voltage Vdc and the inverted voltage Vo of the lighting unit 103 according to the second embodiment 1 relative to the source voltage Vs, measured during the time from power feed start to illumination start.

As illustrated in FIG. 14, with the lighting unit 103 according to the second embodiment 1, the FET 1Q1 turns ON when the source voltage Vs reaches Vt, so that the inverter circuit 107 starts. With increase of the source voltage Vs, the inverted voltage Vo and the smoothed voltage Vdc increase. As a result, a dielectric breakdown in the arc tube 3 occurs and the lamp 101 emits light.

As described above, with the starting circuit composed of the resistors and Zener diode having the above-described specifications, the FET 1Q1 turns ON when the source voltage Vs is 129.7V or higher (Vt in the figure). Since the voltage value Vt is higher than the source voltage 120V, the lamp 101 cannot be lit if the lamp 101 is improperly used with a 120V lighting fixture. This provides a noticeable indication for the user to make a check and realize that the 277V lamp is mistakenly used for a 120V lamp.

Note that the smoothing circuit according to the second embodiment 1 is for full smoothing. Yet, similarly to the smoothing circuit 53 according to the first embodiment, a partial smoothing circuit may be employed. The following briefly describes a modification 3 according to which the second embodiment 1 is modified to employ a partial smoothing circuit, with reference to FIG. 15.

Figure 15:
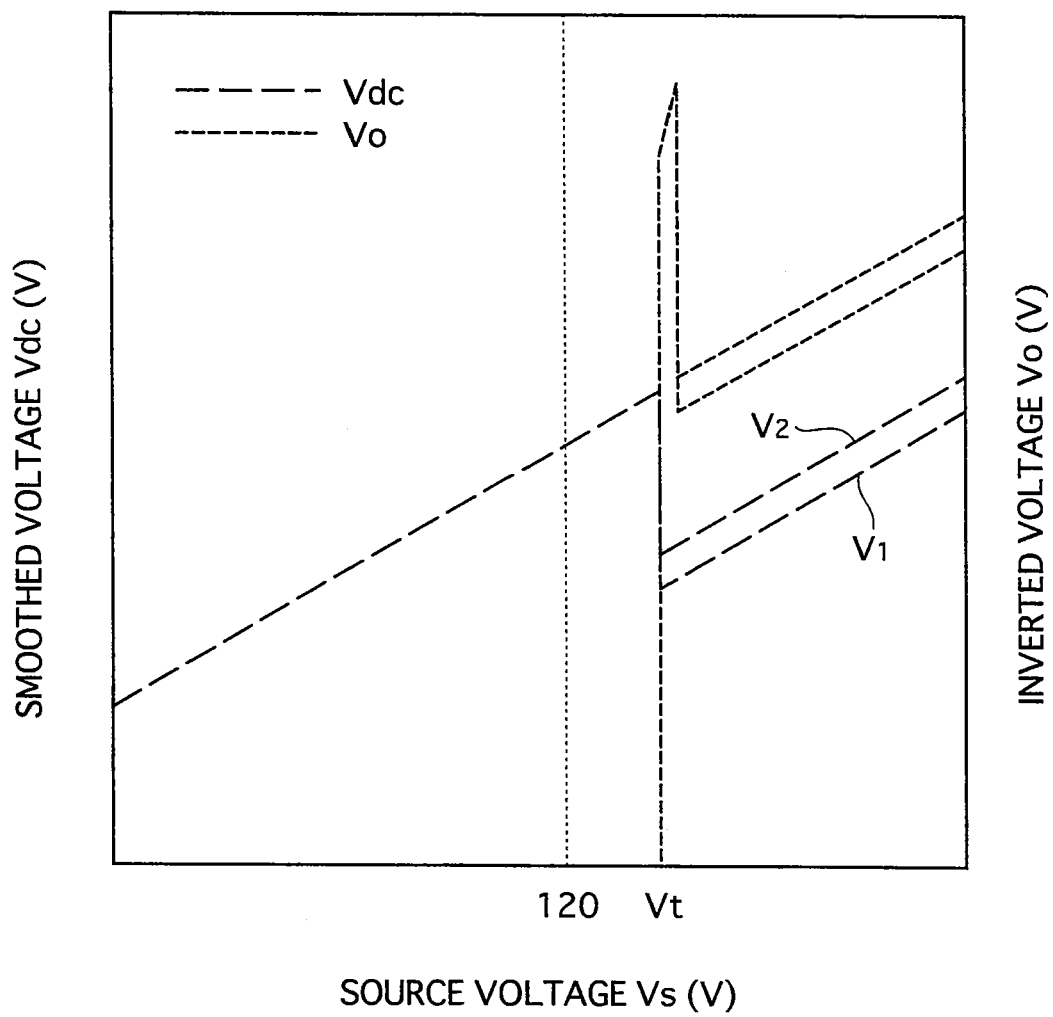
FIG. 15 is a chart indicating variations of the smoothed voltage Vdc and the inverted voltage Vo of a lighting unit according to a modification 3 relatively to the source voltage Vs.

FIG. 15 is a chart indicating variations of the smoothed voltage Vdc and the inverted voltage Vo of the lighting unit 103 according to the modification 3 relatively to the source voltage Vs, measured during the time from power feed start to illumination start.

Even with a partial smoothing circuit, the value of the starting voltage at which the FET 1Q1 is turned ON is determined by the specifications of electronic components of the starting circuit including the resistors R2, R3, and R4.

As long as the source voltage Vs at which the FET 1Q1 starts is higher than 120V, the modification 3 achieves a similar effect as the second embodiment 1.

(2) Illumination of Arc Tube

The following describes a second embodiment 2 according to which a dielectric breakdown of the arc tube does not occur when the source voltage Vs is 120V.

The lamp according to the second embodiment 2 includes a lighting unit that is identical to the lighting unit 7 according to the first embodiment. Difference with the first embodiment lies in the structure of the arc tube. The arc tube is so designed that a dielectric breakdown occurs when applied with the source voltage Vs that is higher than 120V.

Figure 16:
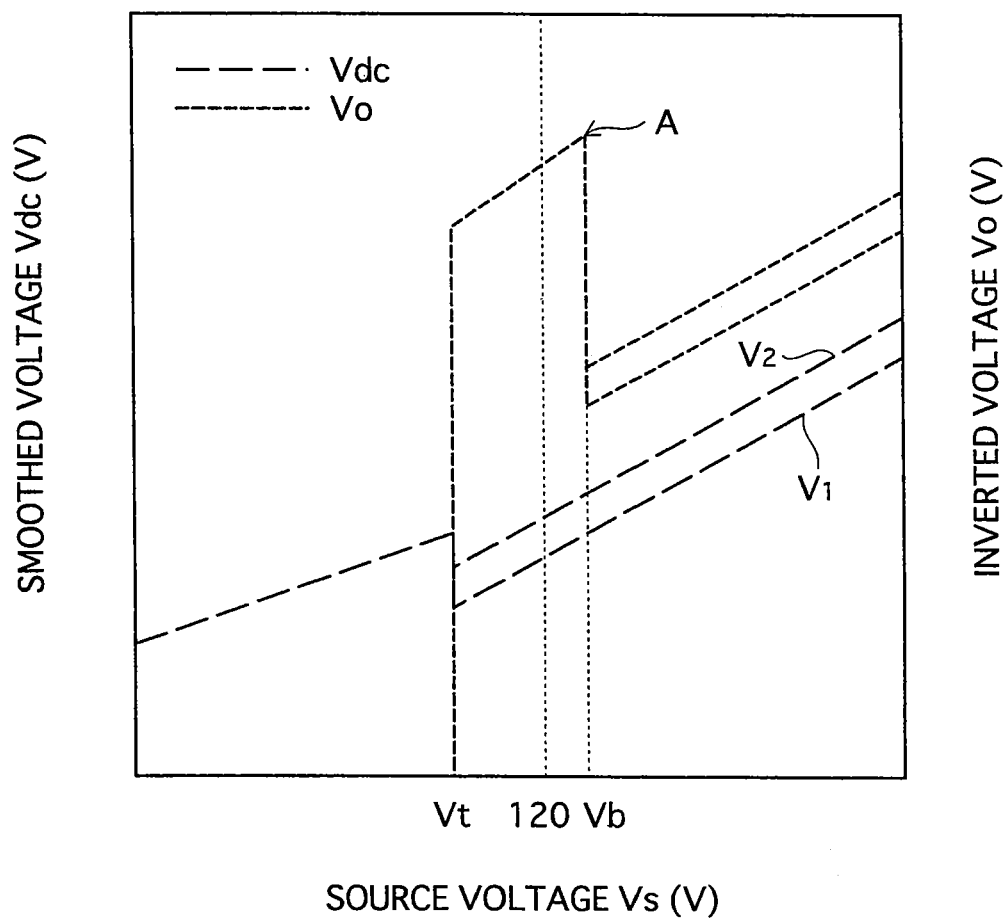
FIG. 16 is a chart indicating variations of the smoothed voltage Vdc and the inverted voltage Vo output from a lighting unit according to a second embodiment 2 relatively to source voltage Vs.

FIG. 16 is a chart indicating variations of the smoothed voltage Vdc and the inverted voltage Vo output from the lighting unit 103 according to the second embodiment 2 relatively to source voltage Vs, measured during the time from power feed start to illumination start.

As illustrated in FIG. 16, the FET (1Q1) starts when the source voltage Vs reaches the voltage value Vt. When the source voltage Vs reaches the voltage value Vt, the FET (1Q1) is turned ON.

With increase of the source voltage Vs, the smoothed voltage Vdc and the inverted voltage Vo increase. When the source voltage Vs reaches the dielectric breakdown voltage Vb, a dielectric breakdown in the arc tube occurs (at the point A in the figure). As a result, the arc tube starts to emit light and thus the inverted voltage Vo drops sharply.

Thereafter, the source voltage Vs increases to reach 277V, so that the lamp illuminates at the predetermined intensity in normal operation.

Next, a description of the lamp according to the second embodiment 2 is given.

Figure 17:
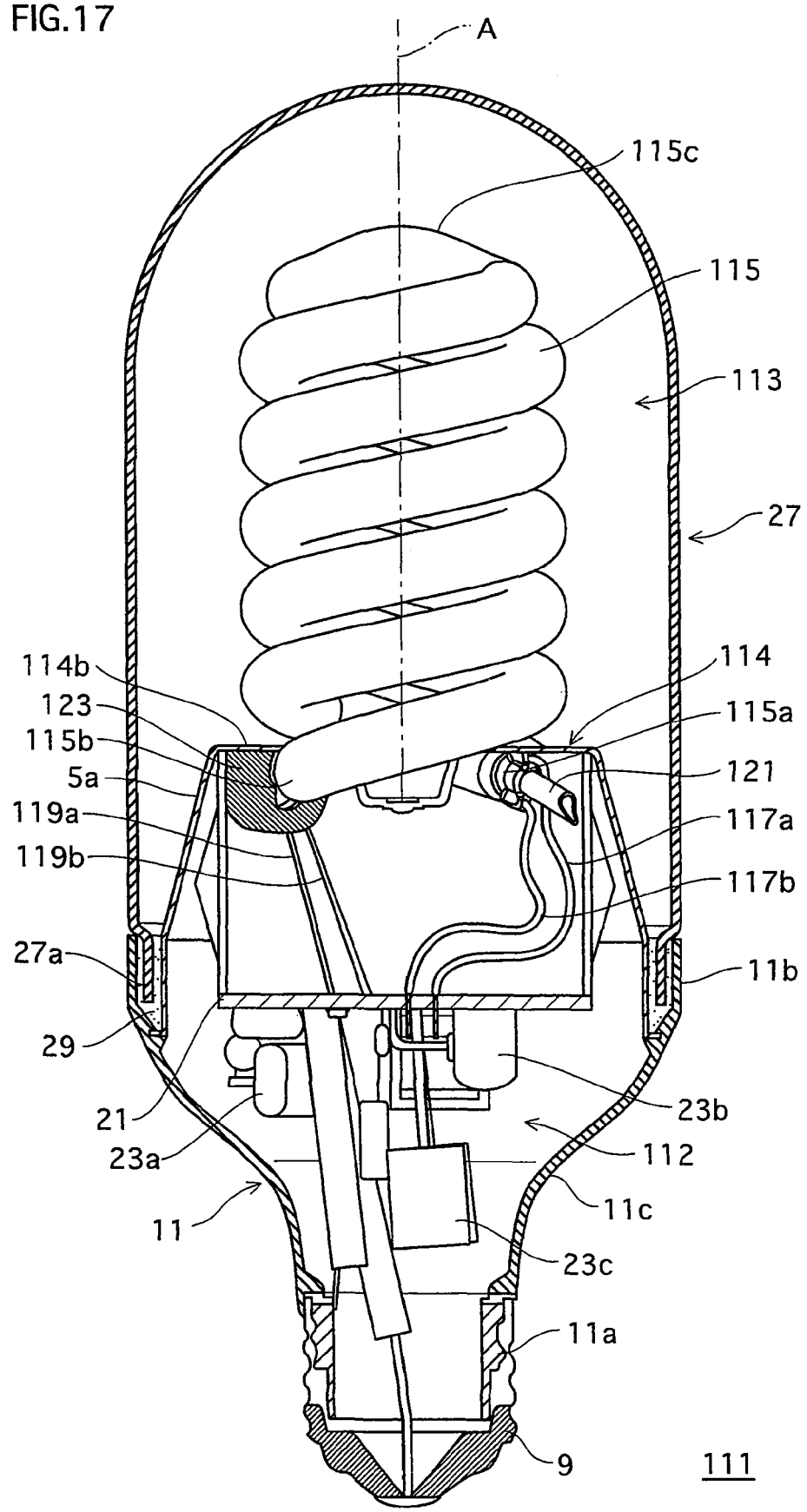
FIG. 17 is a sectional view of a lamp according to the second embodiment 2.

FIG. 17 is a sectional view of the lamp according to the second embodiment 2.

As illustrated in FIG. 17, a lamp 111 includes an arc tube 113 having a discharge path of a double spiral shape, a holder 114 for holding the arc tube 113, a lighting unit 112 for lighting the arc tube 113, a case 11 having a base 9 attached to one end thereof and housing the lighting unit 112 therein. Note that the same reference numerals are used to denote components identical to those used in the lamp 1 according to the first embodiment.

The arc tube 113 has a tube body 115 having a double spiral shape and a pair of electrodes (not illustrated) sealed one at each end 115a and 115b of the tube body 115. The ends of the tube body 115 correspond to the ends of the discharge path.

In this embodiment, the tube body 115 is composed of one glass tube (with the outside diameter of 9.0 mm, for example) having a bend at a substantially middle thereof. Portions of the glass tube from the bend 115c toward the respective ends 115a and 115b are wound around an imaginarily spiral axis A to form a double spiral.

Lead wires 117a and 117b sealed within the end 115a of the tube body 115 are connected to the lighting unit 112. Similarly, lead wires 119a and 119b sealed within the other end 115b of the tube body 115 are connected to the lighting unit 112.

The length of the discharge path formed through the arc tube 113 is 620 mm, for example. In addition, the arc tube 113 is filled with mercury, buffer gas, and the like. A thin tube 121 is sealed at the end 115a of the tube body 115 along with the electrode.

The ends 115a and 115b of the arc tube 113 are inserted into the holder 114 through the insertion holes in the bottom 114b. With this state, the ends 115a and 115b are fixed to the inner surfaces of the holder 114 with adhesive (for example, silicon resin) 123, so that the arc tube 112 is secured to the holder 114.

The arc tube 113 differs from the arc tube 3 according to the first embodiment in the following points including the glass tube outside diameter, the discharge path length, types of the buffer gas (mixed ratio), and the filling pressure. With this arrangement, the arc tube 113 is so designed that a dielectric breakdown occurs when applied with the source voltage Vs that is higher than 120V.

Similarly to the lighting unit 7 according to the first embodiment, the lighting unit 112 according to the second embodiment 2 includes a partial smoothing circuit. Alternatively, however, the lighting unit 112 may include a full smoothing circuit similar to the lighting unit 103 according to the second embodiment 1.

In addition, the electrode 15 of the arc tube 3 may be short-circuited (at the lead wires) as in the case of the lighting unit 103, so as not to preheat the electrodes. With this arrangement, the electrodes are heated only by the electric current flowing through the arc tube and thus flickering is made to occurs more notably.

<Third Embodiment>

The lamps 1, 101, and 111 according to the first and second embodiments are all so-called low-pressure discharge lamps and each includes the arc tube 3 or 113. According to a third embodiment of the present invention, a lamp 201 includes light-emitting elements (so-called LEDs) instead of an arc tube.

Figure 18:
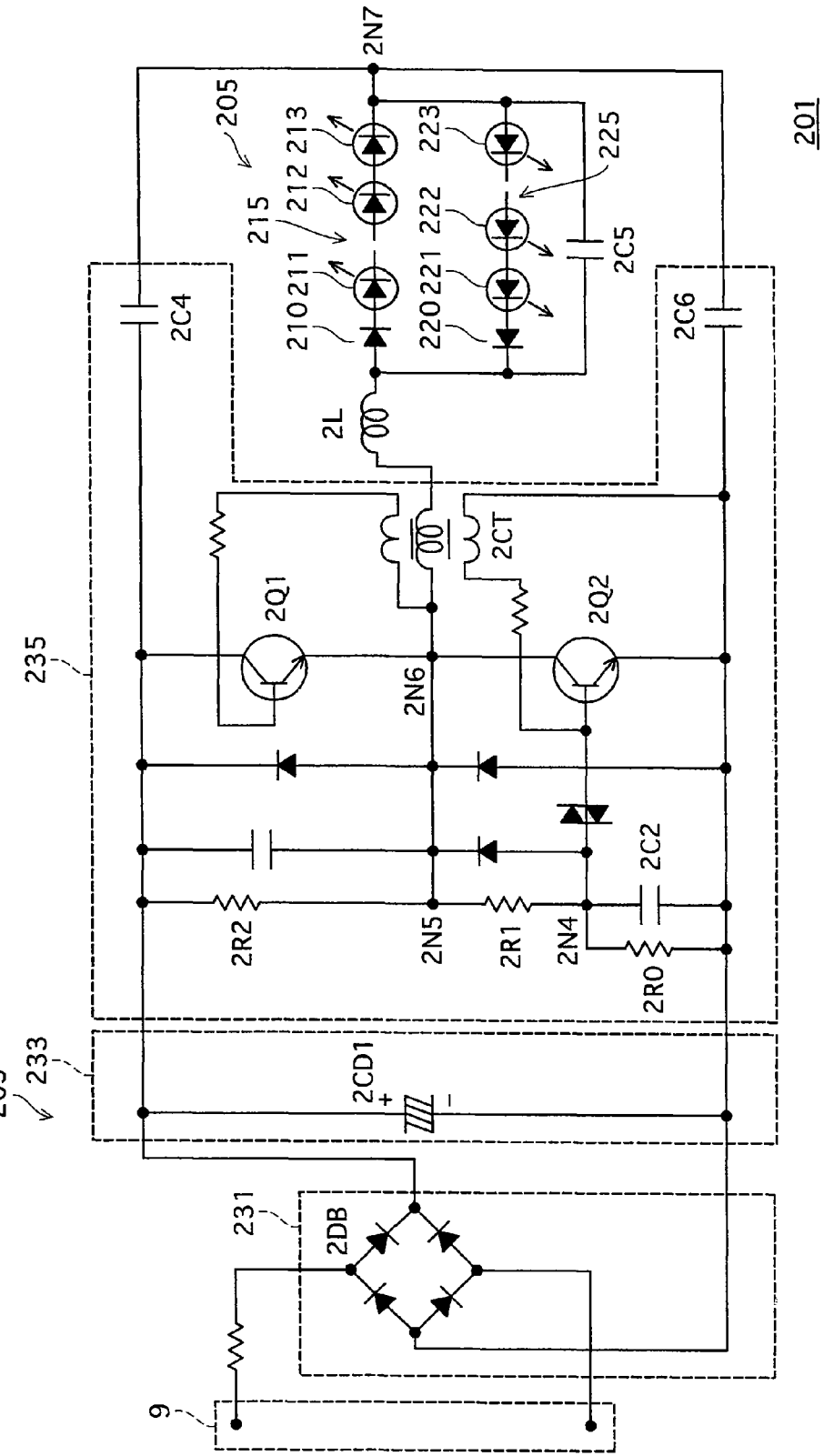
FIG. 18 is a circuit diagram of a lamp 201 including a lighting unit 203 according to a third embodiment.

FIG. 18 is a circuit diagram of the lamp 201 including a lighting unit 203 according to the third embodiment.

The lamp 201 includes a light-emitting unit 205 composed of a plurality of LEDs, a lighting unit 203 for operating (lighting) the light-emitting unit 205, and a base 9 for supplying electric power to the lighting unit 203.

The light-emitting unit 205 includes a first LED array 215, a second LED array 225, and a capacitor 2C5 that are connected in parallel. The first LED array 215 includes a plurality of serially connected LEDs 210, 211, 212, and 213. The second LED array 225 includes a plurality of serially connected LEDs 220, 221, 222, and 223.

In this embodiment, the LEDs 210-213 in the first LED array 215 are connected to have the same forward direction. Similarly, the LEDs 220-223 in the second LED array 225 are connected to have the same forward direction. Yet, the first and second LED arrays 215 and 225 are connected to have different forward directions.

The lighting unit 203 is mainly composed of a rectifier circuit 231, a smoothing circuit 233, and an inverter circuit 235.

Similarly to the rectifier circuit 51 according to the first embodiment, the rectifier circuit 231 is composed of a diode bridge 2DB. The smoothing circuit 233 is a full smoothing circuit composed of one smoothing capacitor 2CD1. For the smoothing capacitor 2CD1, a capacitor with the electrostatic capacity of 2.2 µF and the rated voltage of 450V may be employed.

The inverter circuit 235 is of a so-called half-bridge type composed of a pair of transistors 2Q1 and 2Q2 (equivalent to the switching elements according to the present invention) and two coupling capacitors 2C4 and 2C6.

For each of the coupling capacitors 2C4 and 2C6, a capacitor with the electrostatic capacity of 47 nF and the rated voltage of 250V may be employed.

The starting circuit composed of the resistors 2R2, 2R1, and 2R0 starts the inverter circuit 235, i.e., switching operation of the transistors 2Q1 and 2Q2. In addition, ON and OFF of the switching is done by the current transformer 2CT.

Now, the following describes the connection between the transistors 2Q1 and 2Q2, the starting circuit, and the current transformer 2CT.

First of all, the emitter of the transistor 2Q1 is serially connected at a node 2N6 to the collector of the transistor 2Q2. The serially connected transistors 2Q1 and 2Q2 are connected in parallel to the smoothing circuit 233. That is to say, the collector of the transistor 2Q1 is connected to the positive terminal of the smoothing circuit 233, whereas the emitter of the transistor 2Q2 is connected to the negative terminal of the smoothing circuit 233.

The resistors 2R2, 2R1, and 2R0 included in the starting circuit are serially connected via the nodes 2N5 and 2N4 in the stated order from the positive terminal of the smoothing circuit 233. In addition, the node 2N5 is connected to a node 2N6. The resistor 2R0 is connected in parallel to the capacitor 2C2.

The coupling capacitor 2C4 is connected at one end to the collector of the transistor 2Q1. In addition, the coupling capacitor 2C6 is connected at one end to the emitter of the transistor 2Q2. The other ends of the coupling capacitors 2C4 and 2C6 are serially connected to each other at a node 2N7.

Between the nodes 2N7 and 2N6, the current transformer 2CT, the choke coil 2L, and the light-emitting unit 205 are serially connected. In conjunction with the capacitor 2C5 connected in parallel to the LED arrays 215 and 225, the choke coil 2L improves the waveform of the electric current flowing through the LED arrays 215 and 225 (from triangular wave to sinusoidal wave, for example).

Similarly to the current transformer CT according to the first embodiment, the current transformer 2CT is composed of one primary coil and two secondary coils. One of the secondary coils of the current transformer 2CT is connected to the node 2N6 and the base of the transistor 2Q1. The other secondary coil is connected to the base and the emitter of the transistor 2Q2.

With the connection as described above, when the voltage at the node 2N4 reaches the predetermined voltage (i.e., the fraction of voltage obtained by the resistor 2R0 reaches the predetermined voltage), the transistor 2Q2 is tuned ON to start switching operation. Then, responsive to the voltage induced in the secondary coils of the current transformer CT, the transistors 2Q1 and 2Q2 alternately repeats ON and OFF.

During the time the transistor 2Q2 is ON, the electric current output from the smoothing circuit 233 flows through the coupling capacitor 2C4, the second LED array 225 of the light-emitting unit 205, the choke coil 2L, the current transformer 2CT, and the transistor 2Q2, before returning back into the smoothing circuit 233.

On the other hand, during the time the transistor 2Q1 is ON, the electric current output from the smoothing circuit 233 flows through the transistor 2Q1, the current transformer 2CT, the choke coil 2L, the first LED array 215 of the light-emitting unit 205, and the coupling capacitor 2C6, before returning back into the smoothing circuit 233.

According to the third embodiment, the specifications of the resistors 2R2, 2R1, and 2R0 included in the starting circuit are determined so that the transistor 2Q2 is turned ON when applied with the source voltage Vs that is higher than 120V.

(1) Modification of Third Embodiment (Modification 4)

Figure 19A:
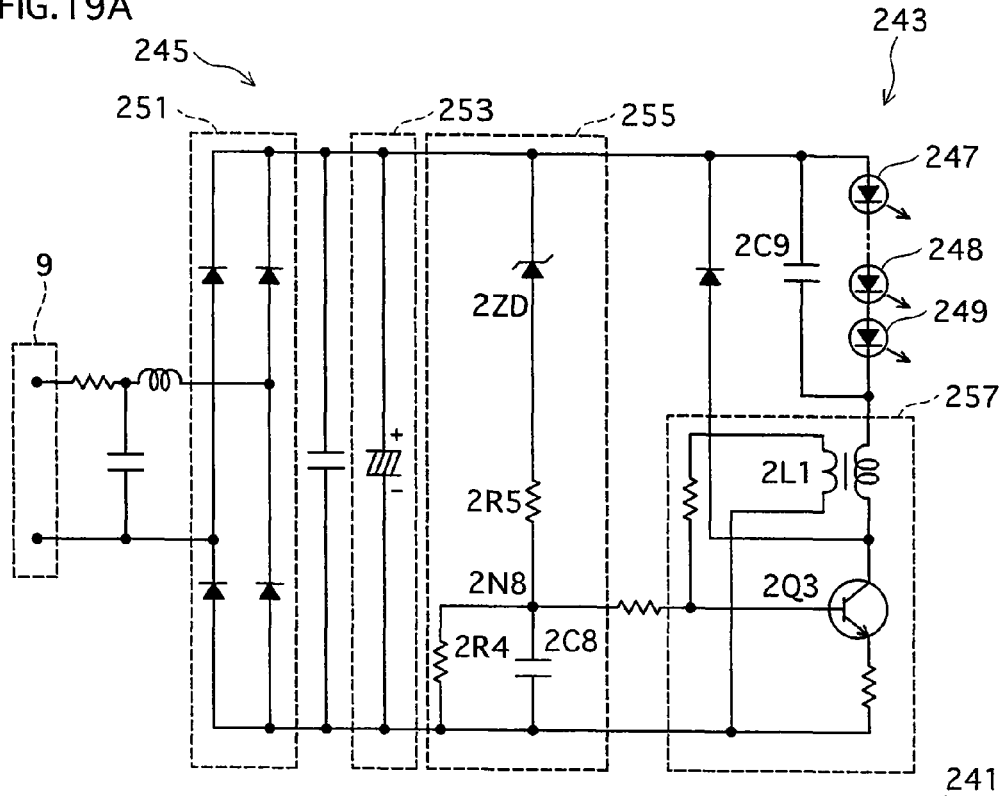
FIG. 19A is a circuit diagram of a lamp 241 that includes a lighting unit 245 according to a modification 4.

FIG. 19A is a circuit diagram of a lamp 241 that includes a lighting unit 245 according to a modification 4 of the present embodiment.

As illustrated in FIG. 19A, the lamp 241 according to the modification 4 includes a light-emitting unit 243 and a lighting unit 245 for operating the light-emitting unit 243. Similarly to the third embodiment, the light-emitting unit 243 includes a plurality of LEDs.

The light-emitting unit 243 includes LEDs 247, 248, and 249 serially connected in a manner that all the LEDs have the same forward direction.

The lighting unit 245 includes a rectifier circuit 251, a smoothing circuit 253, a starting circuit 255, and a feed circuit 257.

The rectifier circuit 251 and the smoothing circuit 253 are identical in structure to the rectifier circuit and the smoothing circuit according to the third embodiment. The feed circuit 257 includes means for adjusting the switching elements as well as the ON state of the switching element. More specifically, the switching element is embodied by the transistor 2Q3, and the adjusting means is embodied by the choke coil 2L1.

When a predetermined condition is satisfied, the starting circuit 255 turns ON the transistor 2Q3 of the feed circuit 257. The starting circuit 255 is composed of the a Zener diode 2ZD, a resistor 2R5, and a resistor 2R4 connected in series in the stated order from the positive terminal of the smoothing circuit 253.

The resistors 2R5 and 2R4 are connected via a node 2N8. In addition, the resistor 2R4 is connected in parallel to the capacitor 2C8.

Now, the following describes connection of the transistor 2Q3. The transistor 2Q3 is connected at the base to the node 2N8. The collector of the transistor 2Q3 is connected to one end of the light-emitting unit 243 via the choke coil 2L1. The emitter of the transistor 2Q3 is connected to the negative terminal of the smoothing circuit 253.

The choke coil 2L1 includes one primary coil and one secondary coil. As described above, the primary coil is serially connected between the collector of the transistor 2Q3 and the light-emitting unit 243. In addition, the secondary coil is connected to the node 2N8 (the base of the transistor 2Q3) and the emitter of the transistor 2Q3.

The electric current flowing through the primary coil of the choke coil 2L1 is direct current output from the smoothing circuit 253. The electric current includes AC components generated in response to ON and OFF of the transistor 2Q3. Thus, the secondary coil induces voltage corresponding to the AC components (ripples) of the electric current following in the primary coil. The transistor 2Q3 tunes ON and OFF responsive to the induced voltage.

Note that capacitor 2C9 connected in parallel to the light-emitting unit 243 composed of the serially connected LEDs 247, 248, and 249 smoothes the electric current flowing through the LEDs 247, 248, and 249.

With the above-described connection, the voltage at the node 2N8 (i.e., the fraction of voltage obtained by the resistor 2R4) satisfies the predetermined condition (reaches the predetermined voltage value), the transistor 2Q3 is turned ON. As a consequence, the electric current (direct current) out of the smoothing circuit 253 flows through the light-emitting unit 243, the choke coil 2L1, and the transistor 2Q3, and then returns back into the smoothing circuit 253.

At this time, the electric current flowing through the primary coil of the choke coil 2L1 includes the AC components and the voltage corresponding to the AC components is induced in the secondary coils. With the induced voltage, the transistor 2Q3 repeats ON and OFF and the light-emitting unit 243 stays illuminated by the energy built up in the primary coil.

Also in the modification 4, the specifications of the resistors 2R5 and 2R4 and the Zener diode 2ZD in the starting circuit are so determined that the transistor 2Q3 is turned ON when applied with the source voltage Vs that is higher than 120V.

(2) Modification of Third Embodiment (Modification 5)

According to the modification 4, the transistor is turned ON and OFF in response to the fraction of voltage obtained at the node 2N8. Yet, the transistor may be turned ON and OFF by an integrated circuit IC.

Figure 19B:
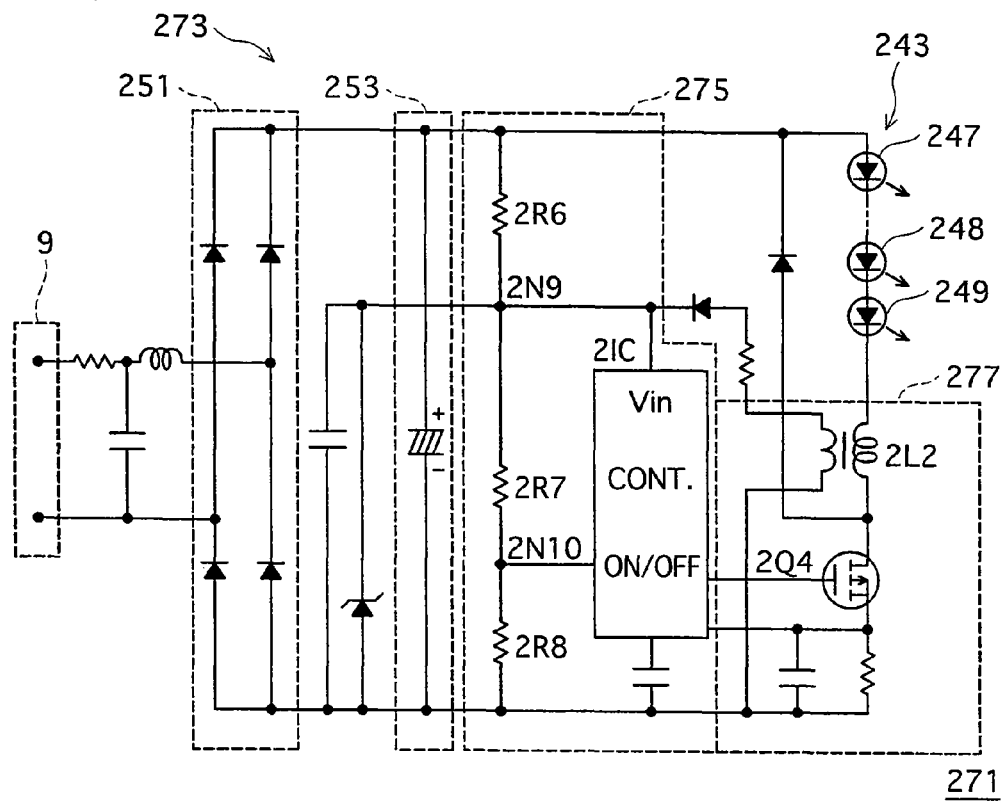
FIG. 19B is a circuit diagram of a lamp 271 including a lighting unit 273 according to a modification 5.

FIG. 19B is a circuit diagram of a lamp 271 including a lighting unit 273 according to the modification 5 of the present invention.

As illustrated in FIG. 19B, the lamp 271 according to the modification 5 includes a light-emitting unit 243 and a lighting unit 273 for operating the light-emitting unit 243. Similarly to the third embodiment, the light-emitting unit 243 includes a plurality of LEDs and is identical in structure to the light-emitting unit according to the modification 4.

The lighting unit 273 includes a rectifier circuit 251, a smoothing circuit 253, a starting circuit 275, and a feed circuit 277. The rectifier circuit 251 and the smoothing circuit 253 are identical in structure to the rectifier circuit and the smoothing circuit according to the third embodiment.

The feed circuit 277 includes an FET 2Q4 acting as a switching element and a choke coil 2L2 for driving an integrated circuit 21C that adjusts the ON state of the FET 2Q4.

The starting circuit 275 includes the integrated circuit 21C for judging whether a predetermined condition is satisfied or not. More specifically, three resistors 2R6, 2R7, and 2R8 are serially connected via nodes 2N9 and 2N10. The serial resistors 2R6, 2R7, and 2R8 are connected in parallel to the smoothing circuit 253.

The integrated circuit 21C measures the voltage at the nodes 2N9 and 2N10. When the voltage at the node 2N10 reaches a predetermined value, the integrated circuit 21C turns ON the FET 2Q4.

Similarly to the modification 4 described above, the specifications of the resistors 2R6, 2R7, and 2R8 and the integrated circuit 21C of the lighting unit 273 according to the modification 5 are so determined that the FET 2Q4 is not turned ON when the source voltage Vs is 120V.

<Supplemental Note>

1. Lighting Unit

The lighting units 7 and 103 according to the first embodiment and the second embodiment 1, respectively, are for lighting the arc tube 3. On the other hand, the lighting unit 203 according to the third embodiment is for lighting the light-emitting unit 205 composed of LEDs.

However, it is applicable that the lighting units 7 and 103 are modified to light the light-emitting unit according to the third embodiment. Similarly, the lighting unit 203 may be modified to light the arc tube according to the first embodiment and second embodiment 1.

Naturally, when making such a modification to the lighting units, it is necessary to change the specifications of the electronic components of the lighting units.

2. Partial Smoothing Circuit

The smoothing circuit is not limited to the circuit 53 described in the first embodiment. Any smoothing circuit is applicable as long as a plurality of smoothing capacitors are included and the smoothing capacitors are connected to be in series at the time of charging and in parallel at the time of discharging. The following describes modifications 6-8 directed to partial smoothing circuits having different structures.

(1) Modification 6

Figure 20A:
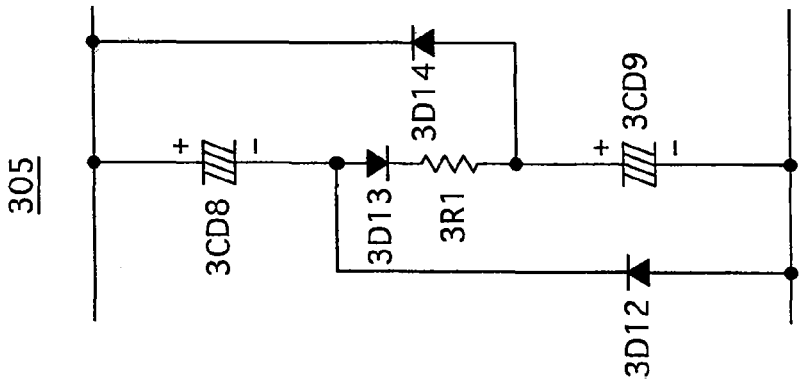
FIG. 20A is a circuit diagram of a smoothing circuit 301 according to a modification 6.

FIG. 20A is a circuit diagram of a smoothing circuit 301 according to a modification 6 of the present invention.

The parietal smoothing circuit 301 according to the modification 6 includes three smoothing capacitors 3CD1, 3CD2, and 3CD3 and six diodes 3D1, 3D2, 3D3, 3D4, 3D5, and 3D6.

The three smoothing capacitors 3CD1, 3CD2, and 3CD3 are serially connected via diodes 3D2 and 3D5 placed between each two capacitors. The diodes 3D2 and 3D5 are connected so that the forward direction coincides with the direction from the positive terminal toward the negative terminal of the rectifier circuit.

The cathode terminal of the diode 3D1 is connected between the smoothing capacitor 3CD1 and the diode 3D2. The cathode terminal of the diode 3D4 is connected between the smoothing capacitor 3CD2 and the diode 3D5.

The diodes 3D1 and 3D4 are connected, so that the forward direction coincides with the direction from the negative terminal of the rectifier circuit toward the smoothing capacitors 3D1 and 3D2. In addition, the anode terminals of the respective diodes 3D1 and 3D4 are connected to the negative terminal of the rectifier circuit.

In addition, the anode terminal of the diode 3D3 is connected between the diode 3D2 and the smoothing capacitor 3CD2. The anode terminal of the diode 3D6 is connected between the diode 3D5 and the smoothing capacitor 3CD3.

The diodes 3D3 and 3D6 are connected, so that the forward direction coincides the direction from the smoothing capacitors 3D2 and 3D3 toward the positive terminal of the rectifier circuit. In addition, the cathode terminals of the respective diodes are connected to the positive terminal of the rectifier circuit.

With the above-described connection, the smoothing capacitors 3CD1, 3CD2, and 3CD3 are placed in series at the time of charging. On the other hand, at the time of discharging, the serially connected smoothing capacitor 3CD1 and diode 3CD1 are, the serially connected diode 3D3, smoothing capacitor 3CD2, and diode 3D4, and the serially connected diode 3D6 and smoothing capacitor 3CD3 are placed in parallel.

With this connection, the first voltage value V1 of the smoothed voltage becomes one-third of the second voltage value V2 shown in FIG. 5.

(2) Modification 7

Figure 20B:
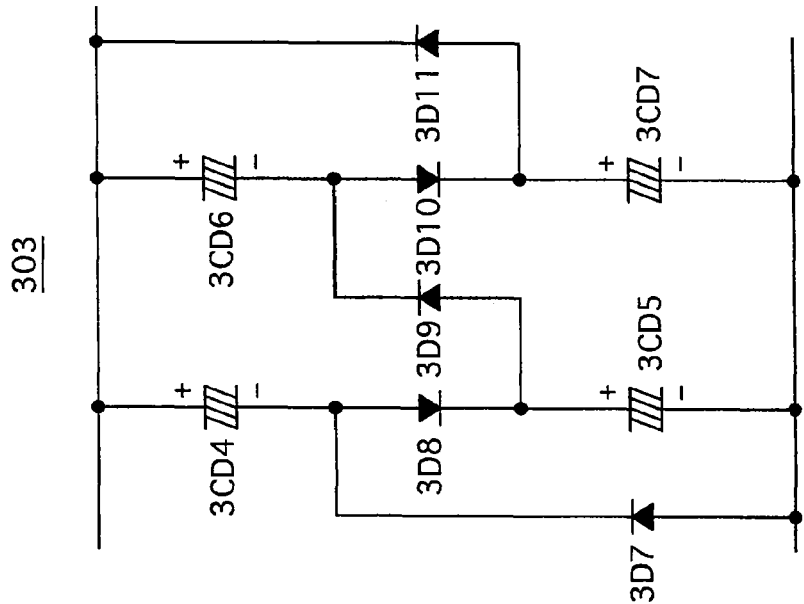
FIG. 20B is a circuit diagram of a partial smoothing circuit 303 according to a modification 7.

FIG. 20B is a circuit diagram of a partial smoothing circuit 303 according to a modification 7 of the present invention.

The partial smoothing circuit 303 according to the modification 7 includes four smoothing capacitors 3CD4, 3CD5, 3CD6, and 3CD7 as well as five diodes 3D7, 3D8, 3D9, 3D10, and 3D11.

The smoothing capacitors 3CD4 and 3CD5 are serially connected via the diode 3D8. Here, the cathode terminal of the diode 3D8 is connected to the smoothing capacitor 3CD5. The smoothing capacitors 3CD6 and 3CD7 are serially connected via the diode 3D10. Here, the cathode terminal of the diode 3D10 is connected to the smoothing capacitor 3CD7.

In addition, the diode 3D9 connects a node between the serially connected diode 3D8 and smoothing capacitor 3CD5 with a node between the serially connected smoothing capacitor 3CD6 and diode 3D10. Here, the cathode terminal of the diode 3D9 is concocted to the diode 3D10.

In addition, a node between the smoothing capacitor 3CD4 and the diode 3D8 is connected to the cathode terminal of the diode 3D7. The diode 3D7 is so connected that the forward direction coincides with the direction from the negative terminal of the rectifier circuit toward the smoothing capacitor 3CD4. Here, the anode terminal of the diode 3D7 is connected to the negative terminal of the rectifier circuit.

In addition, a node between the diode 3D10 and the smoothing capacitor 3CD7 is connected to the anode terminal of the diode 3D11. The diode 3D11 is so connected that the forward direction coincides with the direction from the smoothing capacitor 3CD7 toward the positive terminal of the rectifier circuit. Here, the cathode terminal of the diode 3D11 is connected to the positive terminal of the rectifier circuit.

With the above-described connection, at the time of charging, the smoothing capacitors 3CD4 and 3CD5 are in series and the smoothing capacitors 3CD6 and 3CD7 are in series.

On the other hand, at the time of discharging, discharge occurs in a series circuit composed of the diode 3D7 and the smoothing capacitor 3CD4, a series circuit composed of the smoothing capacitor 3CD6, the diode 3D9, and the smoothing capacitor 3CD5, and a series circuit composed of the smoothing capacitor 3CD7 and the diode 3D11.

With this arrangement, the first and second voltage values V1 and V2 of the smoothed voltage are in the same relation to those illustrated in FIG. 5. Yet, the rate at which the voltage varies between the first and second voltage values can be made slower.

(3) Modification 8

Figure 20C:
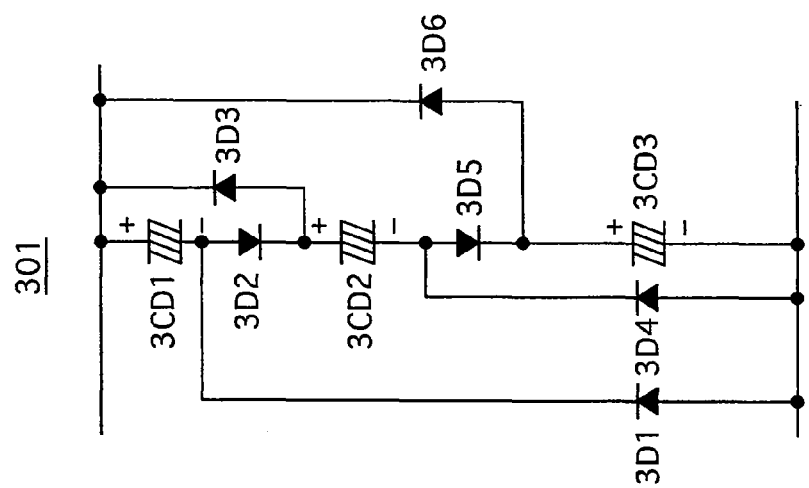
FIG. 20C is a circuit diagram of a partial smoothing circuit 305 according to a modification 8.

FIG. 20C is a circuit diagram of a partial smoothing circuit 305 according to a modification 8 of the present invention.

The partial smoothing circuit 305 according to the modification 8 includes two smoothing capacitors 3CD8 and 3CD9, three diodes 3D12, 3D13, and 3D14, and one resistor 3R1.

The two smoothing capacitors 3CD8 and 3CD9 are serially connected via the diode 3D13 and the resistor 3R1. The forward direction of the diode 3D13 coincides with the direction from the positive terminal toward negative terminal of the rectifier circuit.

A node between the smoothing capacitor 3CD8 and the diode 3D13 is connected to the cathode terminal of the diode 3D12. The forward direction of the diode 3D12 coincides with the direction from the negative terminal of the rectifier circuit toward the smoothing capacitor 3CD8. In addition, the anode terminal of the diode 3D12 is connected to the negative terminal of the rectifier circuit.

A node between the resistor 3R1 and the smoothing capacitor 3CD9 is connected to the anode terminal of the diode 3D14. The forward direction of the diode 3D14 coincides with the direction from the smoothing capacitor 3CD9 toward the positive terminal of the rectifier circuit. In addition, the cathode terminal of the diode 3D14 is connected to the positive terminal of the rectifier circuit.

With the above-described connection, at the time of charging, the smoothing capacitors 3CD8 and 3CD9 are in series. At the time of discharging, on the other hand, the serially connected smoothing capacitor 3CD8 and diode 3D12 and the serially connected smoothing capacitor 3CD9 and diode 3D14 are placed in parallel.

With this arrangement, the first voltage value V1 of the smoothed voltage illustrated in FIG. 5 is expressed as follows:

$$V1=(V2-Vr)/2$$

Here, Vr denotes the voltage of the resistor 3R1.

3. Supplemental Note

According to the second embodiment 1, the lighting unit has a short circuit placed at one of the electrodes of the arc tube and a negative temperature coefficient resistor NTC is connected in parallel to the other electrode. Yet, it is applicable that none of the above arrangements is made to the electrodes. In this case, a large electric current flows through the filament coils during the lamp operation. Consequently, flickering of the lamp that occurs when the source voltage Vs is 120V is less noticeable (unilluminated periods are shorter). Yet, the flickering is still noticeable to human eye, so the effect is comparable to that of the second embodiment 1.

Instead of the negative temperature coefficient resistor NTC, a positive temperature coefficient resistor PTC may be connected in parallel to the arc tube. In this case, at the time of power ON, preheating current flows through the electrodes (filament coils). Thus, the flickering of the lamp that occurs when the source voltage Vs is 120V is less noticeable. Yet, the circuit operations tend to stabilized more easily, so that damage to the circuits and the arc tube caused at the time of misuse is kept to a minimum.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.]

What is claimed is:

1. A lamp with a rated voltage of 277 volts, comprising:
a light-emitting unit including one or more light-emitting diodes; and
an electronic lighting circuit including:
a lighting unit operable to cause the light-emitting unit to illuminate in a manner to visually indicate to a user that the illumination is normal, when an effective source voltage of 277 volts is supplied; and
a lighting control unit operable to cause the light-emitting unit to flash on and off, when an effective source voltage of 120 volts, which is different from the rated voltage, is supplied.

2. The lamp according to claim 1,
wherein the lighting unit includes a switching element operable to start power feed to the light-emitting unit, and
wherein the lighting control unit includes a starting circuit operable to cause the switching element to turn on, when an input signal to the starting circuit reaches a threshold,
wherein the input signal includes ripple components, and
wherein the threshold is (i) smaller than a minimum value of the signal input when the effective source voltage of 277 volts is supplied and (ii) between a minimum value and a maximum value of the signal input when the effective source voltage of 120 volts is supplied.

3. The lamp according to claim 2,
wherein the light-emitting unit includes a plurality of light emitting diodes that are serially connected into a plurality of arrays such that the light-emitting diodes in each array have a same forward direction,
wherein the plurality of arrays includes arrays having mutually opposite forward directions, and
wherein the lighting unit is operable to supply alternating current voltage to the light-emitting unit.

4. The lamp according to claim 2,
wherein the light-emitting unit includes the plurality of light-emitting diodes, LEDs that are serially connected into a single array such that the light-emitting diodes in the array have a same forward direction, and
wherein the lighting unit is operable to supply direct current voltage to the light-emitting unit.

5. The lamp according to claim 2, wherein the electronic lighting circuit further includes:
a rectifier circuit operable to rectify alternating current voltage from a commercial power source; and
a smoothing circuit operable to smooth an output voltage of the rectifier circuit,
wherein the smoothing circuit is an electrolytic capacitor, and
the ripple components are present in an output voltage of the smoothing circuit.

6. The lamp according to claim 5,
wherein the lighting control unit includes an adjusting circuit operable to cause the switching element having been turned on by the starting circuit to turn on and off according to an electric current flowing through the lighting unit.

7. The lamp according to claim 1, wherein the electronic lighting circuit further includes:
a rectifier circuit operable to rectify alternating current voltage from a commercial power source; and
a smoothing circuit operable to smooth an output voltage of the rectifier circuit,
wherein the lighting unit includes a switching element operable to start power feed to the light-emitting unit, and wherein the lighting control unit includes a starting circuit operable to turn on the switching element, when an input signal reaches a threshold, wherein the smoothing circuit is a partial smoothing circuit operable to output a voltage maintained at a predetermined voltage value even when the output voltage of the rectifier circuit becomes lower than the predetermined voltage value, and wherein the predetermined voltage value is lower than the threshold at a time when the effective source voltage of 120 volts is supplied and is higher than the threshold at a time when the effective source voltage of 277 volts is supplied.

8. The lamp according to claim 6, wherein the adjusting circuit is a choke coil including:
   a primary coil connected in series with the lighting unit; and
   a secondary coil magnetically coupled to the primary coil.

9. The lamp according to claim 8,
   wherein the switching element is a transistor, and
   wherein the secondary coil is connected to a base and an emitter of the transistor.

10. The lamp according to claim 8,
    wherein the switching element is a field effect transistor element,
    wherein the starting circuit is an integrated circuit, and
    wherein the secondary coil is connected to a power supply terminal of the integrated circuit and a source of the field effect transistor element.

11. A lamp with a rated voltage of 277 volts, comprising:
    a light-emitting unit including one or more light-emitting diodes; and
    an electronic lighting circuit including:
       a lighting unit operable to cause the light-emitting unit to illuminate in a manner to visually indicate to a user that the illumination is normal, when the lamp is used by being connected to a 277 volt distribution line; and
       a lighting control unit operable to cause the light-emitting unit to flash on and off, when the lamp is used by being connected to a 120 volt distribution line, which is different from the 277 volt distribution line.

12. The lamp according to claim 11,
    wherein the light-emitting unit includes a switching element operable to start power feed to the light-emitting unit,
    wherein the lighting control unit includes a starting circuit operable to cause the switching element to turn on, when an input signal to the starting circuit reaches a threshold,
    wherein the input signal includes ripple components, and
    wherein the threshold is (i) smaller than a minimum value of the signal input when the effective source voltage of 277 volts is supplied and (ii) between a minimum value and a maximum value of the signal input when the effective source voltage of 120 volts is supplied.

13. The lamp according to claim 11, wherein the electronic lighting circuit further includes:
    a rectifier circuit operable to rectify alternating current voltage from a commercial power source; and
    a smoothing circuit operable to smooth an output voltage of the rectifier circuit,
    wherein the lighting unit includes a switching element operable to start power feed to the light-emitting unit, and
    wherein the lighting control unit includes a starting circuit operable to turn on the switching element, when an input signal reaches a threshold,
    wherein the smoothing circuit is a partial smoothing circuit operable to output a voltage maintained at a predetermined voltage value even when the output voltage of the rectifier circuit becomes lower than the predetermined voltage value, and
    wherein the predetermined voltage value is lower than the threshold at a time when the effective source voltage of 120 volts is supplied and is higher than the threshold at a time when the effective source voltage of 277 volts is supplied.

\* \* \* \* \*